US012632450B2

(12) United States Patent
Yue et al.

(10) Patent No.: US 12,632,450 B2
(45) Date of Patent: May 19, 2026

(54) GEOSPATIAL QUERY CACHING

(71) Applicant: PayPal, Inc., San Jose, CA (US)

(72) Inventors: Ying Yue, Shanghai (CN); Xia Zhang, Shanghai (CN); Yu Zhang, Shanghai (CN); Junshi Guo, Shanghai (CN)

(73) Assignee: PayPal, Inc., San Jose, CA (US)

( * ) Notice: Subject to any disclaimer, the term of this patent is extended or adjusted under 35 U.S.C. 154(b) by 0 days.

(21) Appl. No.: 18/590,167

(22) Filed: Feb. 28, 2024

(65) Prior Publication Data

US 2025/0217361 A1    Jul. 3, 2025

(30) Foreign Application Priority Data

Dec. 29, 2023    (WO) ................ PCT/CN2023/143484

(51) Int. Cl.
G06F 16/2453    (2019.01)
G06F 16/2455    (2019.01)
G06F 16/29    (2019.01)

(52) U.S. Cl.
CPC .. G06F 16/24539 (2019.01); G06F 16/24552 (2019.01); G06F 16/29 (2019.01)

(58) Field of Classification Search
CPC ......... G06F 16/24539; G06F 16/24552; G06F 16/29

(Continued)

(56) References Cited

U.S. PATENT DOCUMENTS 7,801,897 B2 *    9/2010    Egnor ................ G06F 16/9537
                                340/539.32
10,331,753 B1 *    6/2019    Zhang ................ G06F 16/9027

(Continued)

FOREIGN PATENT DOCUMENTS

CN    101627384 A    1/2010
CN    103064904 A    4/2013
(Continued)

OTHER PUBLICATIONS

International Search Report and Written Opinion in PCT Appl. No. PCT/CN2023/143482 mailed Sep. 4, 2024, 7 pages.
(Continued)

*Primary Examiner* — Giovanna B Colan

(74) *Attorney, Agent, or Firm* — Kowert, Hood, Munyon, Rankin & Goetzel, P.C.; Catherine L. Gerhardt; Dean M. Munyon

(57)    ABSTRACT

Techniques are disclosed relating to improving the efficiency of geolocation queries via geospatial cells and query parameter caching. In various embodiments, a system receives a request from a user device to access geolocation information of entities and determine a first geographic location of the device. The system identifies that the first location is within a geospatial cell stored in a database cache and determines whether query parameters corresponding to the cell are stored in the cache. The system may retrieve the cached query parameters corresponding to the geospatial cell and execute a geolocation query on a database storing location information for different entities based on the cached query parameters. Results of the geolocation query may be different from query results of one or more other queries executed, based on the cached query parameters, for other user computing devices located within the given geospatial cell based on the cached query parameters.

20 Claims, 14 Drawing Sheets

(58) Field of Classification Search
USPC ........................................................ 707/713
See application file for complete search history.

(56)             References Cited

U.S. PATENT DOCUMENTS

| 10,402,455 | B1 * | 9/2019 | Phanse | ............... | G01C 21/3611 |
|---|---|---|---|---|---|
| 10,496,768 | B2 | 12/2019 | Zhang | | |
| 10,762,190 | B1 | 9/2020 | Cuan et al. | | |
| 10,846,353 | B2 * | 11/2020 | Rayanchu | ............... | H04L 43/16 |
| 11,064,047 | B1 | 7/2021 | Stegall et al. | | |
| 11,442,920 | B2 | 9/2022 | Zang | | |
| 11,455,238 | B2 | 9/2022 | Zhang | | |
| 11,704,182 | B2 | 7/2023 | Huang | | |
| 11,818,163 | B2 | 11/2023 | Sharma | | |
| 12,079,292 | B1 | 9/2024 | Badr et al. | | |
| 2014/0032326 | A1 | 1/2014 | Li et al. | | |
| 2015/0052009 | A1 | 2/2015 | Ketchell, III | | |
| 2015/0058308 | A1 | 2/2015 | Zheng | | |
| 2015/0362988 | A1 | 12/2015 | Yamamoto et al. | | |
| 2016/0069699 | A1 | 3/2016 | Chen et al. | | |
| 2016/0070712 | A1 | 3/2016 | Prabhakar et al. | | |
| 2016/0188602 | A1 | 6/2016 | Glover et al. | | |
| 2016/0232789 | A1 | 8/2016 | Chan | | |
| 2016/0299905 | A1 | 10/2016 | Geyer et al. | | |
| 2017/0103080 | A1 | 4/2017 | Quong | | |
| 2017/0192981 | A1 | 7/2017 | Glover et al. | | |
| 2017/0192982 | A1 | 7/2017 | Glover et al. | | |
| 2018/0060341 | A1 | 3/2018 | Wu | | |
| 2018/0165293 | A1 * | 6/2018 | Wei | ................... | G06F 16/24539 |
| 2019/0102461 | A1 | 4/2019 | Pennell et al. | | |
| 2019/0324981 | A1 | 10/2019 | Counts et al. | | |
| 2019/0360819 | A1 | 11/2019 | Mao et al. | | |
| 2020/0210228 | A1 | 7/2020 | Wu | | |
| 2021/0334312 | A1 | 10/2021 | Neo | | |
| 2022/0321581 | A1 | 10/2022 | Sood | | |
| 2022/0374783 | A1 | 11/2022 | Sharma | | |
| 2022/0414528 | A1 | 12/2022 | Chhibber | | |
| 2022/0414529 | A1 | 12/2022 | Chhibber | | |
| 2023/0040721 | A1 | 2/2023 | Chhibber | | |
| 2023/0041015 | A1 | 2/2023 | Chhibber | | |
| 2023/0120186 | A1 | 4/2023 | Huang | | |
| 2023/0171235 | A1 | 6/2023 | Chhibber | | |
| 2023/0206108 | A1 | 6/2023 | Le Van Gong | | |

FOREIGN PATENT DOCUMENTS

| CN | 106126575 A | * | 11/2016 | ......... | G06F 16/9537 |
|---|---|---|---|---|---|
| JP | 2022007887 A | | 1/2022 | | |
| KR | 20050000225 A | | 1/2005 | | |
| WO | 2022000375 A1 | | 1/2022 | | |
| WO | 2022272262 A1 | | 12/2022 | | |
| WO | 2023015111 A1 | | 2/2023 | | |
| WO | 2023114636 A1 | | 6/2023 | | |

OTHER PUBLICATIONS

International Search Report and Written Opinion in PCT Appl. No. PCT/CN2023/143484 mailed Sep. 12, 2024, 7 pages.

* cited by examiner

Geographic Database
150

Database Table
250

| Entity Identifier (ID) 252 | Location Information 104 |
|---|---|
| 123456789 | 38.82285, -77.035091 |
| 123456788 | 40.791, -73.9841 |
| 123456999 | 40.7801, -73.934589 |
| 123456799 | 40.7817, -73.923511 |

⋮                                    ⋮

Database Index
270

| Cell ID 272 | Entity ID 252 |
|---|---|
| 100010011011 | N/A (User) |
| 100010011100 | 123456789 |
| 100010011100 | 123456788 |
| 100010011100 | 123456999 |

⋮                                    ⋮

First Query Parameters 402A

Example Increase
Search 400

Latitude: 40.75777
Longitude: -73.98222
Search Region Key: "40.75-73.98"
Cached Radius: None
Current Radius: 0.25 miles
Entity Threshold Requirement: 100

Entities
438

Search Radius
432A

Search Region
434A
(With Threshold
Number of Entities)

Second Query Parameters 402B

Latitude: 40.75777
Longitude: -73.98222
Search Region Key: "40.75-73.98"
Cached Radius: 0.5
Current Radius: 0.5 miles
Entity Threshold Requirement: 70

Entities
438

Search Radius
432B

Search Region
434B
(With Threshold
Number of Entities)

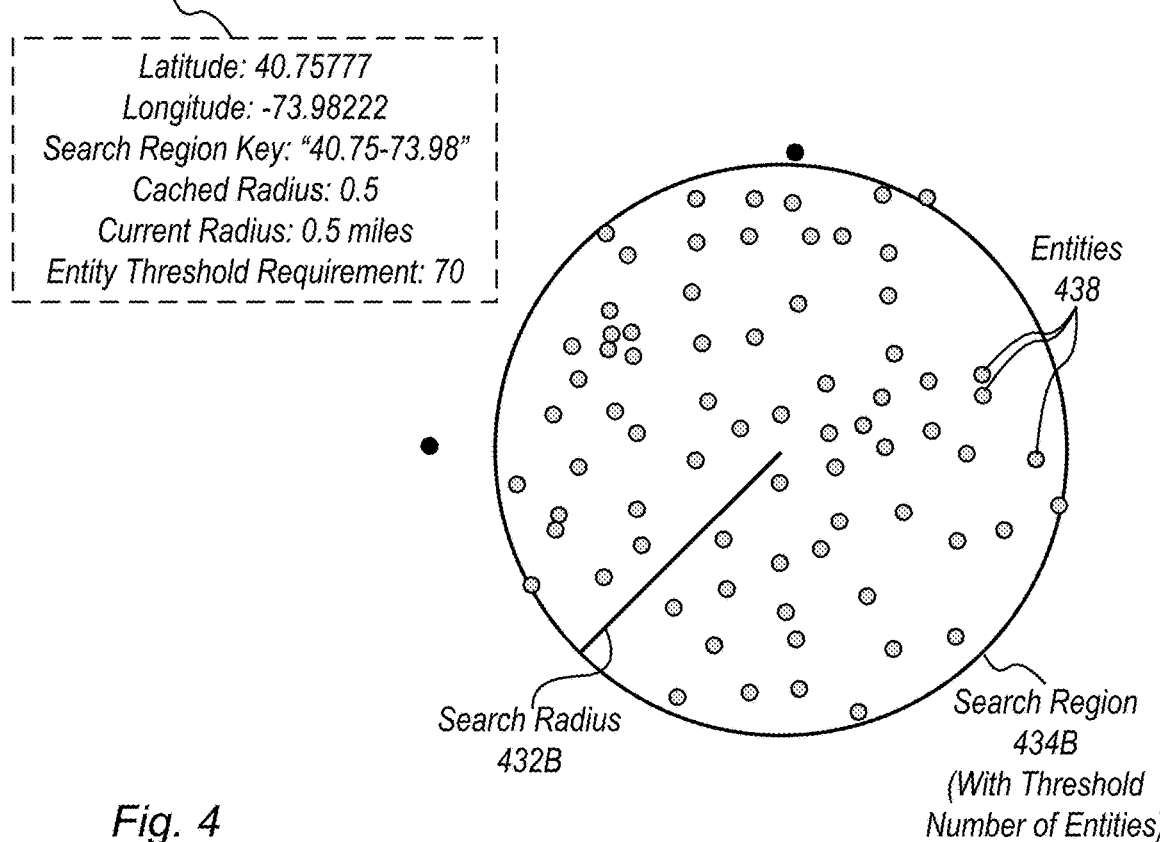

*Fig. 4*

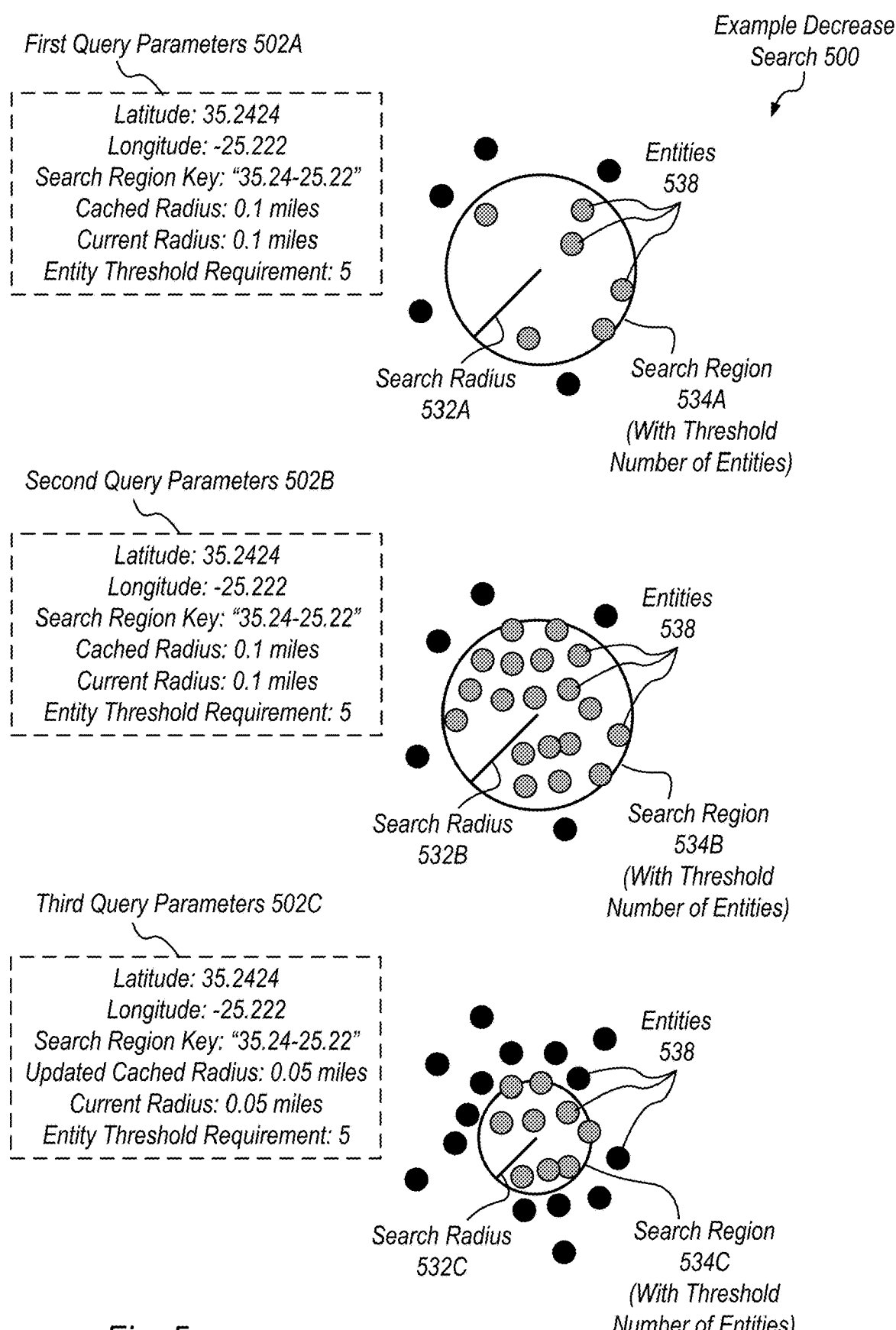

First Query Parameters 502A

Latitude: 35.2424
Longitude: -25.222
Search Region Key: "35.24-25.22"
Cached Radius: 0.1 miles
Current Radius: 0.1 miles
Entity Threshold Requirement: 5

Example Decrease
Search 500

Entities
538

Search Radius
532A

Search Region
534A
(With Threshold
Number of Entities)

Second Query Parameters 502B

Latitude: 35.2424
Longitude: -25.222
Search Region Key: "35.24-25.22"
Cached Radius: 0.1 miles
Current Radius: 0.1 miles
Entity Threshold Requirement: 5

Entities
538

Search Radius
532B

Search Region
534B
(With Threshold
Number of Entities)

Third Query Parameters 502C

Latitude: 35.2424
Longitude: -25.222
Search Region Key: "35.24-25.22"
Updated Cached Radius: 0.05 miles
Current Radius: 0.05 miles
Entity Threshold Requirement: 5

Entities
538

Search Radius
532C

Search Region
534C
(With Threshold
Number of Entities)

Fig. 5

*Method 600*

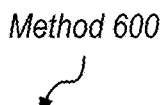

Select, based on a geographic location of a user computing device, a first search region, wherein the geographic location of the user computing device corresponds to a center point of the first search region.
610

Execute, based on the first search region, a first query on a database storing geographic locations of a plurality of entities.
620

Increase the first search region by a specified amount to generate a second search region, where the increasing is performed based on determining that a number of entities returned by the first query does not satisfy an entity threshold requirement.
630

Execute, based on the second search region, a second query on the database.
640

In response to the second query returning a number of entities that satisfy the entity threshold requirement, cause display, at the user computing device, of the entities returned by the second query.
650

*Fig. 6*

*Example Geospatial Cells 810*

*Example Query Cache 860*

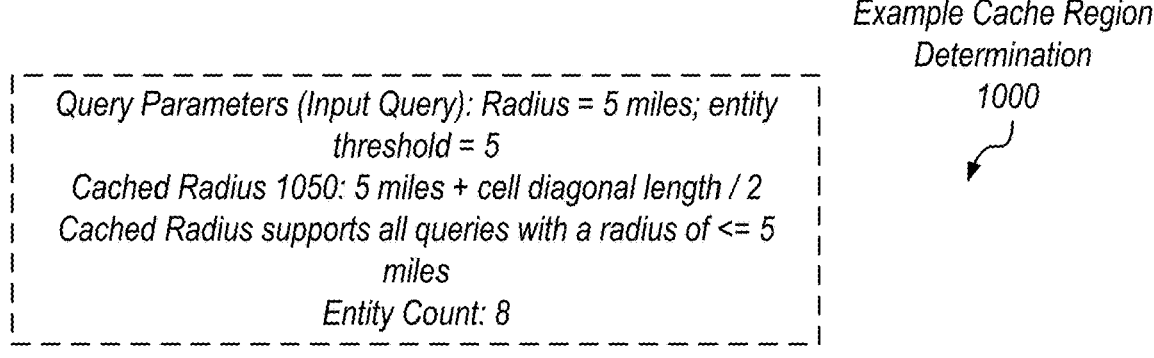

*Query Parameters (Input Query): Radius = 5 miles; entity threshold = 5*
*Cached Radius 1050: 5 miles + cell diagonal length / 2*
*Cached Radius supports all queries with a radius of <= 5 miles*
*Entity Count: 8*

*Example Cache Region Determination 1000*

Cache Region
1010
(For Cell 1020)

Entity
1038

Current
Center Point
1004

Cell Center
Point 1002

Query Radius
1040

Cell Diagonal
1022

Smallest Region
to Search for
Current Query
1060

Cell 1020

Cached Radius
1050

*Fig. 10*

*Example Cache Region Determination For Dense Area 1100*

Input Query Parameters: radius = 5 miles; entity threshold = 10
Cache Search Radius = distance from user center point to farthest entity + distance from user center point to cell center point + length of the cell's diagonal

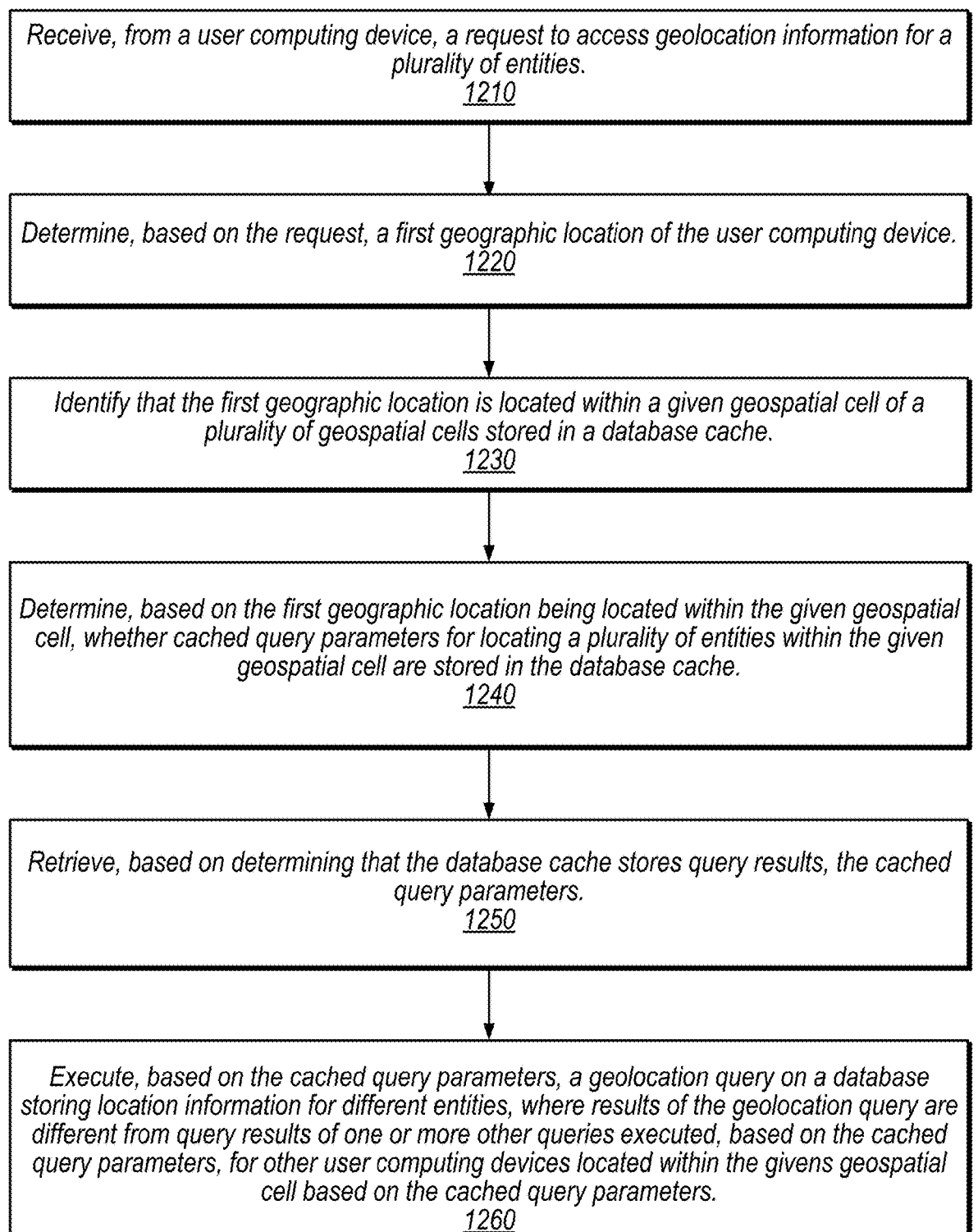

Receive, from a user computing device, a request to access geolocation information for a plurality of entities.
1210

Determine, based on the request, a first geographic location of the user computing device.
1220

Identify that the first geographic location is located within a given geospatial cell of a plurality of geospatial cells stored in a database cache.
1230

Determine, based on the first geographic location being located within the given geospatial cell, whether cached query parameters for locating a plurality of entities within the given geospatial cell are stored in the database cache.
1240

Retrieve, based on determining that the database cache stores query results, the cached query parameters.
1250

Execute, based on the cached query parameters, a geolocation query on a database storing location information for different entities, where results of the geolocation query are different from query results of one or more other queries executed, based on the cached query parameters, for other user computing devices located within the givens geospatial cell based on the cached query parameters.
1260

Fig. 12

GEOSPATIAL QUERY CACHING

CROSS-REFERENCE

The present application claims priority to PCT Appl. No. PCT/CN2023/143484, entitled "GEOSPATIAL QUERY CACHING", filed Dec. 29, 2023, which is incorporated by reference herein in its entirety. This application is related to U.S. patent application Ser. No. 18/590,129 titled "Self-Adaptive Geospatial Queries." The above-referenced application is hereby incorporated by reference as if entirely set forth herein.

BACKGROUND

Technical Field

This disclosure relates generally to fundamental improvements for querying techniques, and, more specifically, to techniques for efficiently querying on geospatial data, which results in improved processing time and user experience, according to various embodiments.

Description of the Related Art

In various computing scenarios, a database may contain geographic locations of one or more physical real-world entities. When querying such a database for one or more geographic locations, performance of the search may be negatively impacted by a variety of factors. When such databases include large numbers of these geographic locations, search performance may be reduced beyond desired or acceptable limits, and computer software applications that rely on the database query may be negatively impacted. Applicant recognizes the need for improvements in this area of computational and database performance, and includes herein techniques and structures to boost operational efficiency of geo-database queries, according to various embodiments.

BRIEF DESCRIPTION OF THE DRAWINGS

FIG. 4 is a diagram illustrating an example of increasing a search region for a given geospatial query, according to some embodiments.

FIG. 5 is a diagram illustrating an example of decreasing a search region for a given geospatial query, according to some embodiments.

FIG. 6 is a flow diagram illustrating an example method for determining a minimum search region with a threshold number of entities within the minimum search region, according to some embodiments.

FIG. 10 is a diagram illustrating an example cache region determination for a geospatial cell, according to some embodiments.

FIG. 12 is a flow diagram illustrating a method for caching query parameters for geospatial cells for performing similar geolocation queries, according to some embodiments.

DETAILED DESCRIPTION

Figure 1:
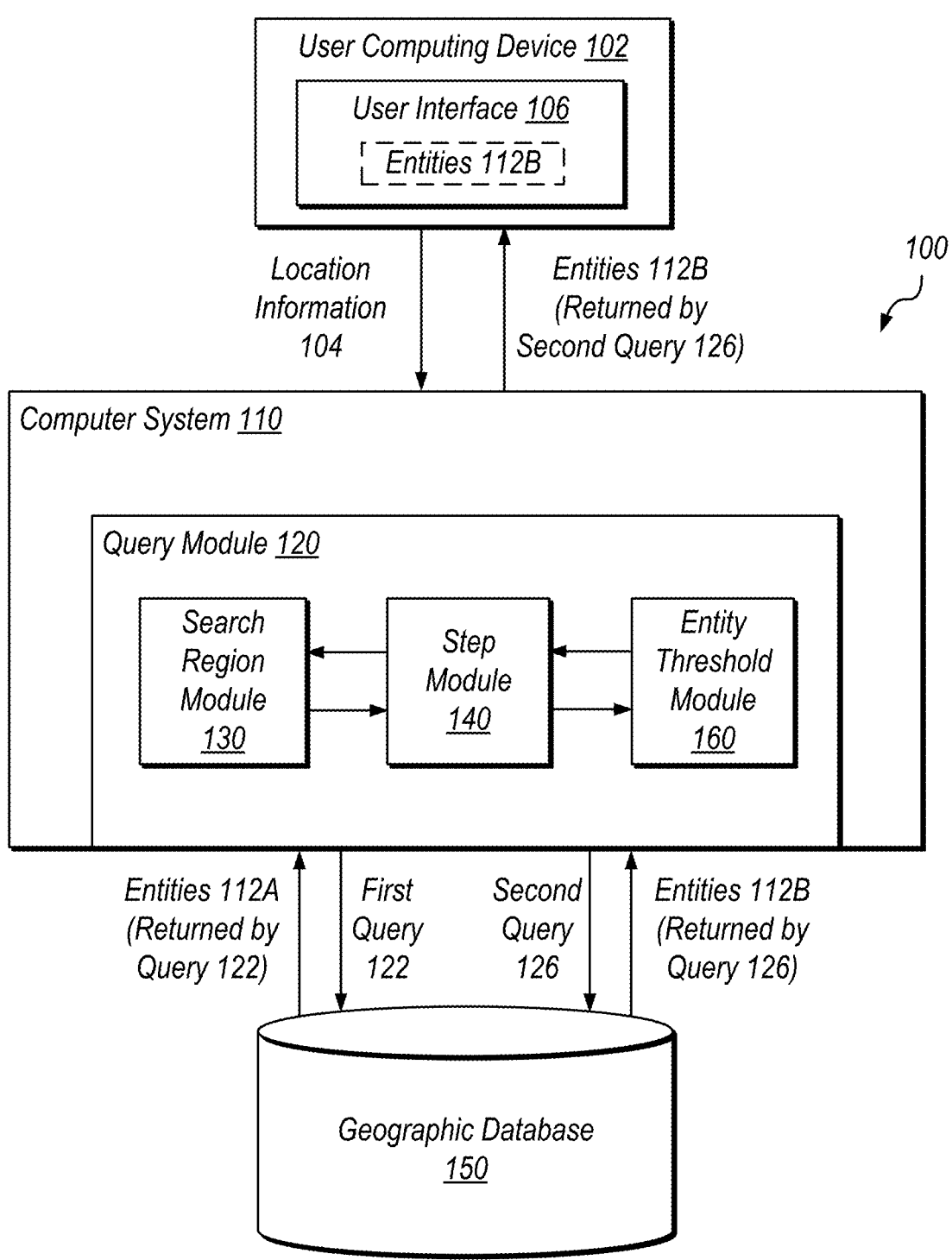
FIG. 1 is a block diagram illustrating an example system configured to perform self-adaptive queries on geospatial data, according to some embodiments.

Machine learning techniques can be used to determine locations of various entities geographically. As one example, a k-nearest neighbor (KNN) supervised machine learning algorithm may be used to automatically recognize which entities are located nearest to a specific location based on a similarity metric. Further in this example, the number of entities located via the KNN search is often based on a particular entity threshold. In such situations, the results of the KNN search may be used for various applications. Such machine learning search techniques, however, are often computationally expensive and inefficient. For example, for a given location query, several iterations of searches may be required (with alteration of the search parameters each iteration) in order to locate a desired number of entities relative to a particular location. Applicant recognizes that the inability to perform efficient location queries presents a significant opportunity for improvement.

Queries performed on a database are often used to locate a specific set of data stored in the database, based on a set of search parameters. For example, if a database stores weather data, then a query on the database that specifies parameters for retrieving weather data for San Francisco, California in the month of June 2023, would return weather patterns for this city within the specified date range. As another example, if the database were to store geographic locations for various entities, the query parameters might specify a number of entities to locate that are located near a given location.

As one specific example, if a user is walking in San Francisco, California and opens an application on their phone (e.g., a PayPal application), the application might locate the 50 entities that are closest to the user's current location in order to show the user their locations as well as additional information about the entities (e.g., products or services currently offered by the entities). In this example, however, the application does not know how big the search needs to be geographically in order to display a desired number of entities. As such, the application opened on the users device may iteratively execute multiple different queries on the geographic database, each with an increasing search size until 50 entities are returned. This example process is cumbersome, requiring a large amount of computational resources to execute the multiple queries, as well as time consuming often leading to long wait times for users interacting with the application on their phone (which in turn may violate service level agreements (SLAs) of the application).

To address the shortcomings discussed above, the disclosed techniques implement a self-adaptive query system configured to make adjustments in real-time in order to execute queries on geographic data more quickly while also using less computational resources. For example, the query parameters selected by the disclosed system for a geolocation query performed in New York City will be quite different from the query parameters for a geolocation query performed in Idaho. For example, in New York City, which is a dense area, more than 1000 entities may be located within a 3 mile radius of any given point within the city. In contrast, Idaho may have only 100 or less entities within a 3 mile radius of any given point within the state. The disclosed self-adaptive query techniques determine a smallest possible search region that encompasses a specific number of entities. Specifically, the disclosed self-adaptive querying techniques perform a first search for a first user located at a specific location based on a start search region. If the first search does not return a desired number of entities, the system increases the search region by a specific amount and executes a new search based on the updated search region. The disclosed system iteratively repeats this process until the number of entities returned by an updated query satisfies an entity threshold requirement. For future queries in a similar location to the first user, the disclosed techniques will begin querying with a search region that is the size of the search region that satisfied the entity threshold requirement for the first user.

In order to further improve query efficiency for queries performed on geographic data, the disclosed techniques perform query caching, including caching of query parameters for different geospatial cells. For example, the disclosed query caching techniques store query parameters for previous queries performed in different geospatial cells of a grid system (a grid of different geographic locations) such that these query parameters may be used for future queries for users located in similar locations to users for which previous queries were performed. For example, if a query for a first user in a first geospatial cell was successful (returned a desired number of entities), then these query parameters will be cached for the first geospatial cell and future users entering the first geospatial cell will have queries performed for them beginning with the query parameters cached for the first geospatial cell. Performing the disclosed query caching techniques for KNN queries on geographic data may advantageously improve performance of the disclosed computer system by reducing the average latency of queries by 20%, 25%, 30%, etc., returning query results two, five, ten, etc. times faster for "hot regions" (densely populated geographic locations), and increasing a maximum query per second capability of the disclosed computer system from hundreds of queries per second to thousands or more queries per second.

Figure 7:
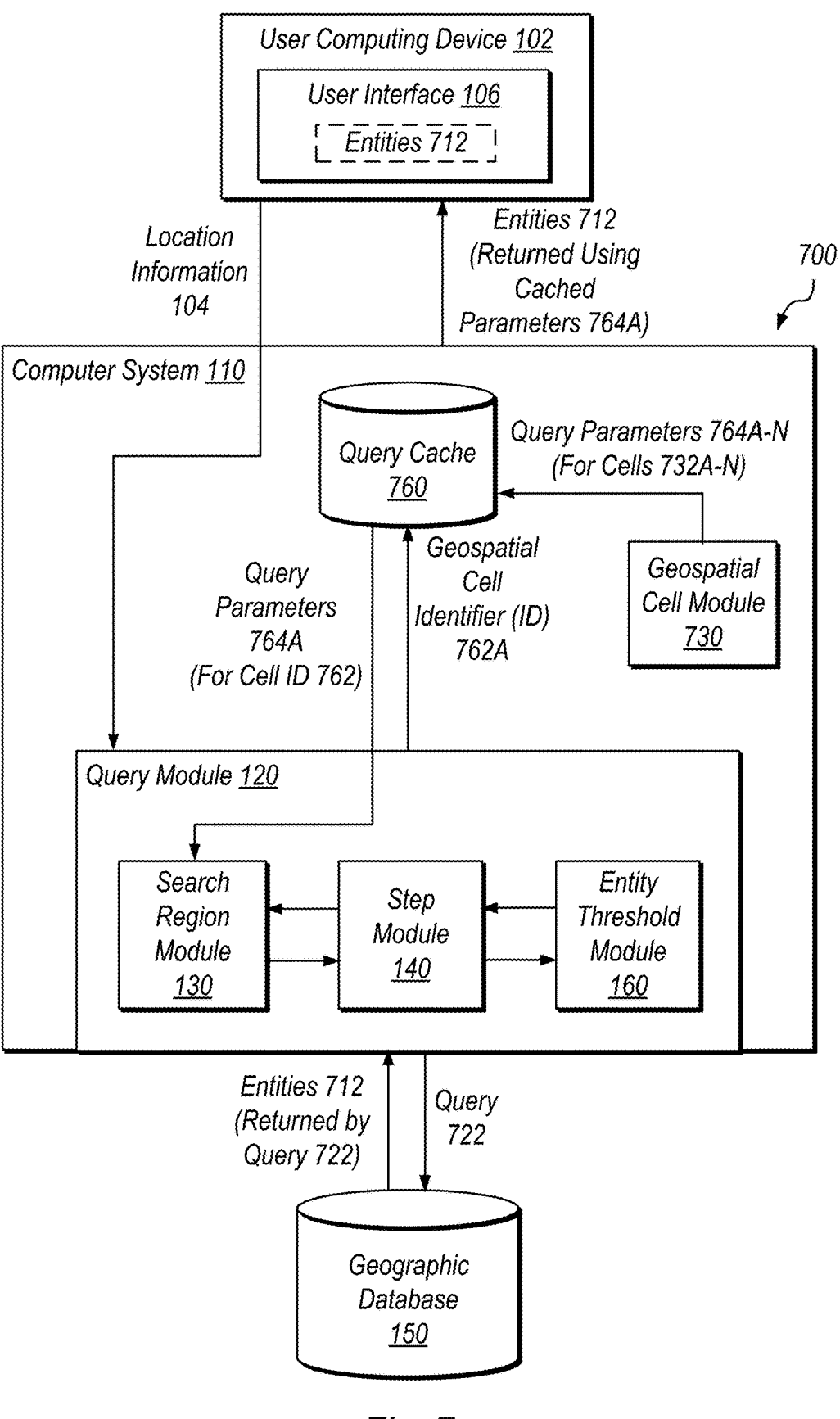
FIG. 7 is a block diagram illustrating an example system configured to cache query parameters for geospatial cells, according to some embodiments.

In disclosed embodiments, FIGS. 1-6 provide illustrative example techniques for self-adaptive querying on geospatial data, while FIGS. 7-12 provide illustrative example techniques for caching query parameters for a plurality of geospatial cells based on the self-adaptive queries on geospatial data. For example, FIGS. 1 and 7 provide illustrations of the systems configured to execute self-adaptive querying and query parameter caching, respectively. FIGS. 6 and 12 illustrate example methods performable by the systems of FIGS. 1 and 7. Meanwhile, FIGS. 2-5 illustrate example implementation of self-adaptive querying, while FIGS. 8-11 illustrate example implementation of caching query parameters for geospatial cells.

Example Self-Adaptive Queries

FIG. 1 is a block diagram illustrating an example system configured to perform self-adaptive queries on geospatial data. In the illustrated embodiment, a user computing device 102 configured to communicate with a system 100 which includes a computer system 110 is shown. Computer system 110, in the illustrated embodiment, includes a query module 120 executable to access geographic database 150 to perform various geospatial queries. Query module 120, in the illustrated embodiment, includes search region module 130, step module 140, and entity threshold module 160.

Computer system 110, in the illustrated embodiment, receives location information 104 from user computing device 102. In some embodiments, computer system 110 receives location information 104 based on a trigger at user computing device 102. For example, a user may open an application on their device 102, which causes the application to send a current location of the device 102 to computer system 110. In various embodiments, the location information 104 includes geographic coordinates, such as the latitude and longitude of user computing device 102, a zip code of the address at which device 102 is located, an Internet protocol (IP) address of device 102, an address provided by the user of user computing device 102 (which the computer system 110 converts into geographical coordinates), etc. As one specific example, a user of device 102 opens an application that processes electronic communications (e.g., electronic transactions such as person-to-person transactions) and the application displays a map to the user showing geographic locations of various entities in which the user might be interested (e.g., the map shows the locations of various merchants that are near the location of the user and with which the user might wish to communicate).

Computer system 110, in the illustrated embodiment, executes query module 120 to perform geolocation queries on a geographic database 150 based on the location information 104 received from user computing device 102. Query module 120 executes search region module 130 to determine a geographic region in which to search for entities. In some embodiments, the search regions determined by search region module 130 are circles generated based on a search radius that extends from the geographic location of user computing device 102. For example, search region module 130 may determine a search radius and, based on this radius and a location of the user computing device 102, generate a circle as a search region with device 102 being the center point of the circle (as shown in FIG. 3B). In other embodiments, the search regions generated by search region module 130 are non-circular shapes. For example, a search region might be a square centered on the location of user computing device 102.

Query module 120, in the illustrated embodiment, executes queries on geographic database 150 to locate a specific number of entities that are closest to the current location of user computing device 102. For example, query module 120 executes k-nearest neighbor queries on geographic database 150. In some embodiments, query module 120 executes queries on a particular geographic region to which the latitude and longitude of the current location of the user computing device 102 correspond (e.g., device 102 is located in the particular geographic region). For example, a plurality of geographic regions are records stored in the geographic database 150, each of the geographic regions encompassing a specific area. As one specific example, a geographic area is a given zip code, city, state, country, etc. In this example, query module 120 determines a search region (via search region module 130 as discussed in further detail below) and retrieves all entities from geographic database 150 that have a location within the search region. The retrieval by query module 120 is performed based on comparing geographic coordinates of the entities stored in the database with the boundaries of the search region. After executing the query on database 150, query module 120 determines whether the query has returned a specific number of entities to be displayed at the user computing device 102. If the first query has not returned a threshold number of entities, query module 120 iteratively updates the query parameters (e.g., to expand the search region) until the specific number of entities is returned by the updated query as discussed in further detail below with reference to the first and second queries 122 and 126.

Search region module 130 determines a search region by first checking whether geographic database 150 (or a database cache maintained by computer system 110) stores search region information (such as a search radius) for a previously executed geographic query for a user device previously located in the same (or similar) location as user computing device 102. If previously used search radius information is not stored in database 150 (or cache) for the location of user computing device 102, search region module 130 determines a new search region. In some embodiments, search region module 130 outputs a default start search region that corresponds to the location of user computing device 102. For example, search region module 130 may store different default search regions for different locations. In this example, if the location information 104 indicates a first location, then search region module 130 outputs a search region that is a circle with a radius of one mile, but if the location information 104 indicates a second location, then search region module 130 outputs a search region that is a circle with a radius of half a mile. In other embodiments, search region module 130 outputs a default starting search region for all geographic locations. In various embodiments, search region module 130 determines a smallest possible radius of a circle that contains a number of entities that satisfies an entity threshold requirement determined by entity threshold module 160, as discussed in further detail below.

Entity threshold module 160, in the illustrated embodiment, determines a threshold number of entities to return for a given query. For example, entity threshold module 160 determines that an entity threshold requirement for user computing device 102 is 100 entities. Query module 120, in the illustrated embodiment, executes a first query 122 on geographic database 150 according to the search region generated by search region module 130 and based on the entity threshold requirement determined by entity threshold module 160. For example, first query 122 executed on geographic database 150 is performed according to a set of search parameters that includes a starting search radius, a location of user computing device 102 (e.g., geographic coordinates), and an entity threshold requirement. First query 122, in the illustrated embodiment, returns a number of entities 112A.

Query module 120 analyzes the results of first query 122 to determine whether the number of entities 112A returned by the query satisfies the entity threshold requirement determined by entity threshold module 160. In various embodiments, query module 120 executes step module 140 to adjust first query 122 based on entities 112A returned by first query 122. For example, if the number of entities 112A returned by the first query does not satisfy the entity threshold requirement determined by module 160, then step module 140 sends instructions to search region module 130 indicating that further queries are required. The instructions sent by step module 140 include an amount by which to alter the search region, for example. Based on these instructions, search region module 130 either increases or decreases the search region (used for first query 122) by a step amount specified by step module 140 as discussed in further detail below with reference to FIGS. 4 and 5. For example, step module 140 may tell search region module 130 to either increase or decrease the radius of the search region by a mile.

In some embodiments, when analyzing results of a first query, query module 120 determines that the number of entities returned by the first query do satisfy the entity threshold requirement. In such embodiments, computer system 110 transmits the number of entities returned by the first query to be displayed at a user computing device for which the first query was performed. In other embodiments, if the number of entities returned by a query surpasses the entity threshold requirement more than a certain amount, then step module 140 instructs search region module 130 to decrease the search region by a specific amount. For example, if a geographic location in which user computing device 102 is located is densely populated, a first query might return too many entities and, thus, query module 120 adjusts the query parameters and performs an updated query on the geographic database 150.

In response to search region module 130 altering the search region, query module 120, in the illustrated embodiment, executes a second query 126 on geographic database 150 for user computing device 102 using the altered search region. For example, the search region for the second query 126 is larger than the search region for the first query 122, and thus, the second query 126 returns a greater number of entities 112B than the number of entities returned by the first query 122. Query module 120 compares the number of entities 112B returned by the second query 126 to the entity threshold requirement. In the illustrated embodiment, based on the number of entities 112B satisfying the entity threshold requirement, computer system 110 transmits the entities 112B to user computing device 102.

User computing device 102, in the illustrated embodiment, includes a user interface 106 usable to display locations of various entities 112B received from computer system 110 in response to requests for entity location information. For example, user interface 106 displays a geographic map that includes the locations of the various entities 112B to a user of device 102 relative to the current location of the user computing device. In this way, the user of device 102 is able to view and interact with the various entities 112B. As one specific example, the user of device 102 may walk to a location of a given entity (e.g., a merchant) displayed in the geographic map in order to interact (e.g., transact) with the given entity.

In some embodiments, in addition to performing efficient geolocation queries on database 150, computer system 110 performs additional filtering of the entities returned by queries. As one specific example, if 100 entities are returned by second query 126, query module 120 further filters these entities (e.g., merchants) based on promotions or special they are currently offering. In this example, if a merchant that is 0.2 miles from a user is included in the query results does not currently offer promotions, but a merchant 0.5 miles from the user that is included in the query results does currently offer promotions, then the merchant that is 0.5 miles away will be displayed via user interface 106, while the merchant that is 0.2 miles from the user will not be displayed via user interface 106. Thus, in this example, only 99 merchants will be displayed at user interface 106 instead of the 100 merchants returned by the self-adaptive querying performed by computer system 110. In various embodiments, computer system 110 may further filter down a list of entities returned by a query based on one or more of the following: user preferences, transaction history, location history, preferences and transaction history of the user's friends, etc.

Note that performing queries on geolocation data is one non-limiting example embodiment of the self-adaptive querying that may be performed by system 100. In various embodiments, system 100 may perform queries on: transaction data (e.g., electronic monetary transactions), graphical data (e.g., a transaction network graph having nodes representing entities and edges representing the electronic transactions between the entities), weather data (e.g., current or future weather patterns for a plurality of locations), merchant data (e.g., merchant locations), promotion data (including corresponding locations), taxi booking data, etc.

Example Geographic Database and Index

Figure 2:
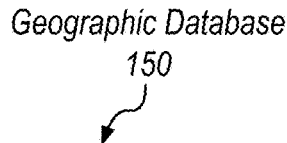
FIG. 2 is a block diagram illustrating an example geographic database and corresponding index, according to some embodiments.

FIG. 2 is a block diagram illustrating an example geographic database and corresponding index. In the illustrated embodiment, an example of geographic database 150 (shown FIG. 1) is shown which includes a database table 250 and a database index 270 generated based on at least database table 250. Geographic database 150 is a non-relational database (e.g., Apache Cassandra™, Apache Hbase™, MongoDB™, etc.) that stores data as key-value pairs. In the illustrated embodiment, database table 250 stores rows of key-value pairs, where the key column of the table stores values for various entity identifiers (IDs) 252 and the value column of the table stores location information 104 for the entities identified by entity IDs 252. For example, database table 250 stores geographic coordinates (latitude and longitude) for various different entities. Database table 250, in the illustrated embodiment, includes a first row that stores an entity ID 252 for entity 123456789, located at 38.82285, −77.035091. Similarly, database table 250 stores geographic coordinates indicating the geographic locations of several different entities including entities identified by the following entity IDs 252: 123456788, 123456999, 123456799, etc.

Database index 270, in the illustrated embodiment, stores entity IDs 252 of entities and geospatial cell IDs 272 (in which the entities are currently located) as key-value pairs. For example, an entity with an entity ID 252 of "123456789" is stored as the value in the second row of database index 270. This entity is located in a geospatial cell identified by a geospatial cell ID 272 of "100010011100." In various embodiments, entity ID's 252 identify geospatial cells in which various merchants are located. In the illustrated embodiment, database index 270 also stores a value of "N/A" for the entity ID 252 column for an entity that is a user, where this entity is located in a geospatial cell identified by an ID of "100010011011." In some embodiments, system 100 generates database index 270 by determining a geospatial cell in which various entities, identified by entity IDs 252, are located based on their corresponding location information 104 (geographic coordinates). In such embodiments, after determining which geospatial cell an entity is located in, system 100 stores the entity ID with the ID of the geospatial cell within the database index 270 for quick retrieval at a later time. In some situations, system 100 generates a map of geospatial cells that consists of a grid of cells overlaid on a map of the world, for example. In some embodiments, the geospatial cells are each the same size. For example, a given geospatial cell is a square with sides of a length of 1000 feet (approximately 300 meters). In other embodiments, the geospatial cells generated by system 100 are varying sizes. For example a first geospatial cell is a square with sides of length 300 feet, while a second geospatial cell is a rectangle with sides of length 1000 feet and 500 feet, respectively. In still other embodiments, system 100 accesses a library of existing geospatial cells in order to generate database index 270.

Example Method for Self-Adaptive Querying

Figure 3A:
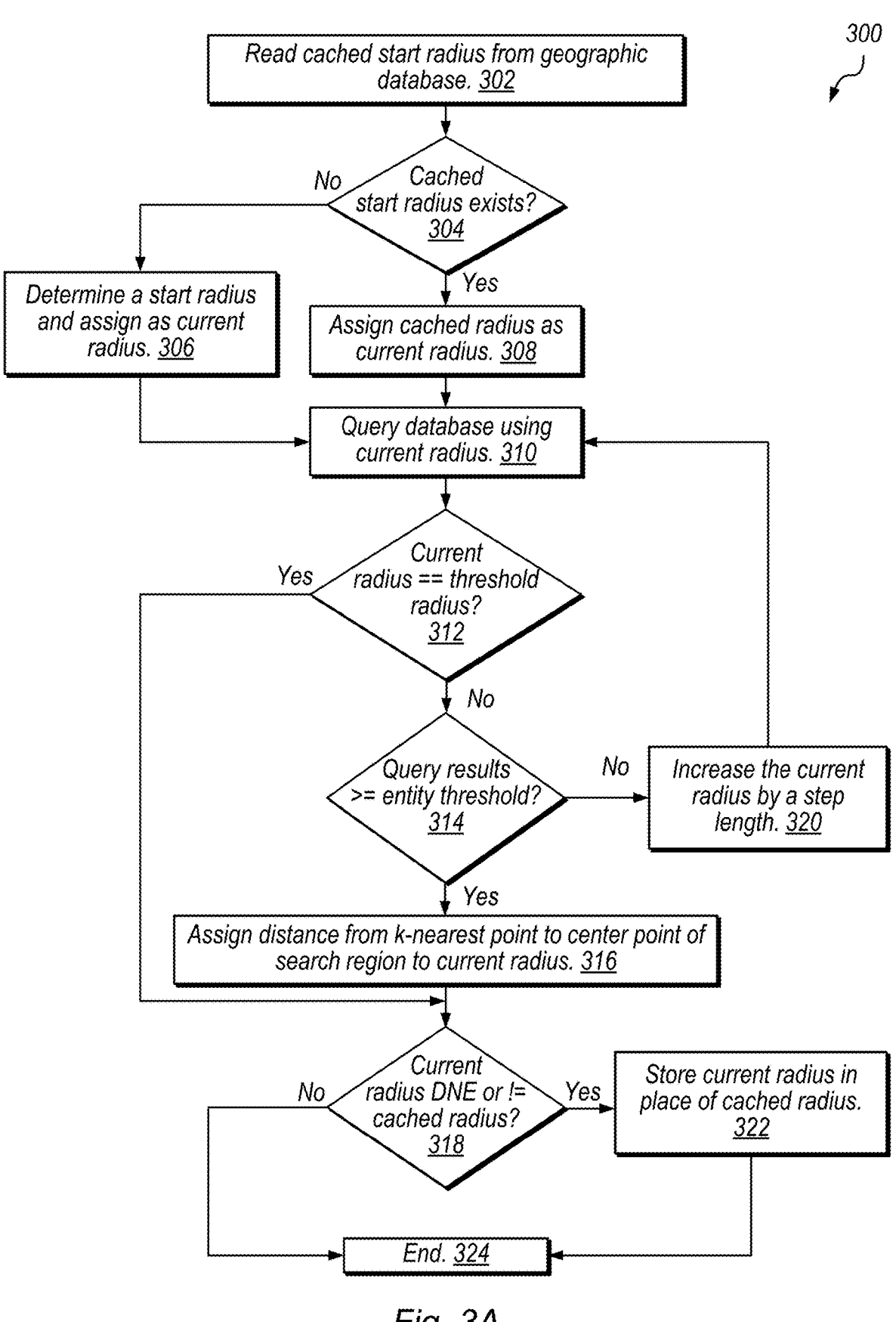
FIG. 3A is a flow diagram illustrating an example method for querying a geographic database using a current search radius, according to some embodiments.
Figure 3B:
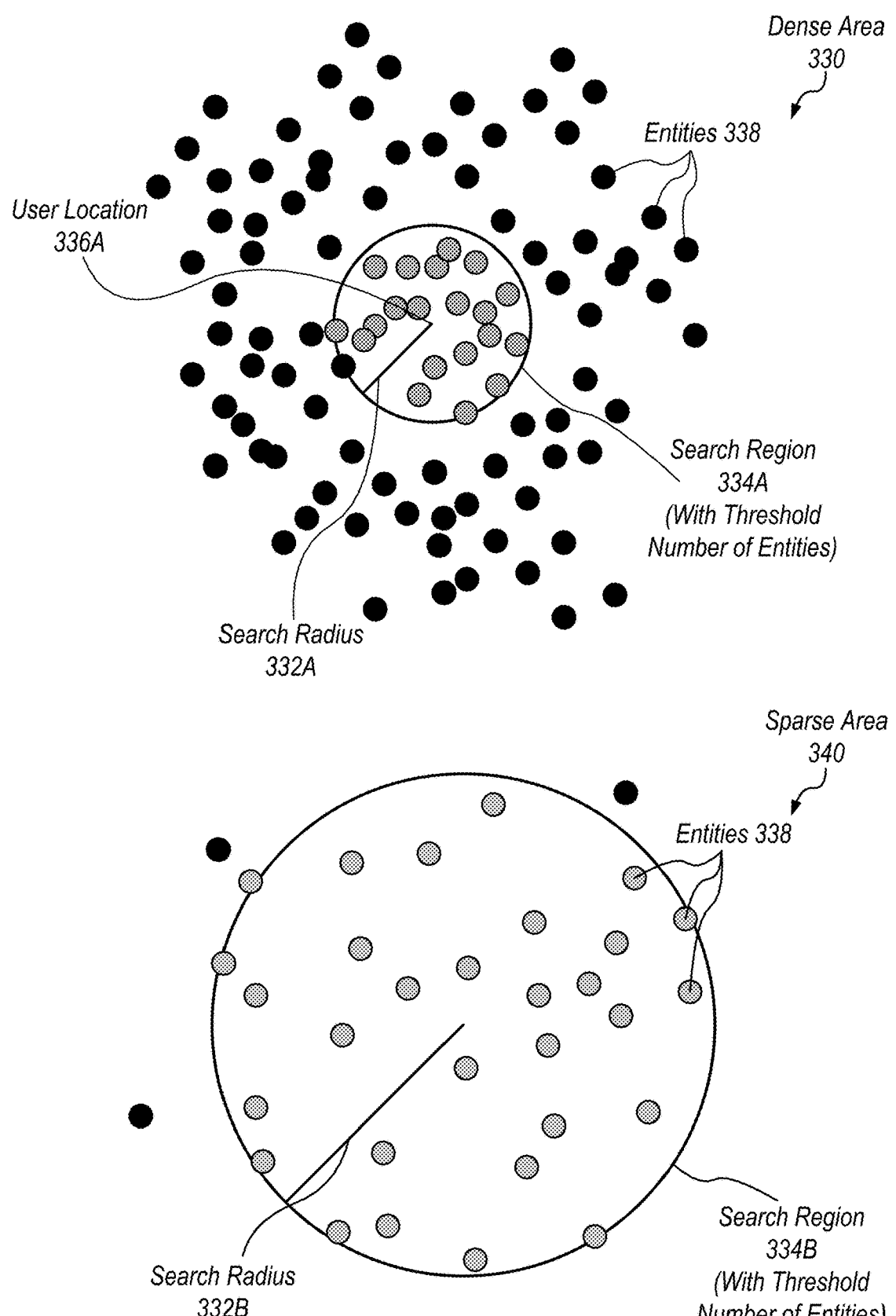
FIG. 3B is a diagram illustrating example search regions determined using the method of FIG. 3A for both dense and sparsely-populated areas, according to some embodiments.

FIG. 3A is a flow diagram illustrating an example method for querying a geographic database using a current search radius. In the illustrated embodiment, method 300 begins at element 302, in which a computer system attempts to read a cached start radius for use in performing a geolocation query to locate entities near the current location of a given user. For example, system 100 may also include a database cache maintained relative to geographic database 150. In this example, the cache may store a start radius previously determined for performing a search to locate various entities. In some embodiments, the elements of method 300 are performed by system 100. In order to perform a query to locate entities for a user, computer system 110 begins by determining a radius for a search region in which the query will be performed. For example, the search region may be a circle, the center point of which is the geographic location of the user computing device for which the query is being performed and the radius of which is determined by computer system 110 via method 300 beginning at element 304.

At element 304, the computer system determines whether a cached start radius exists (e.g., whether a start radius was previously generated and stored in the database cache). If a cached start radius does not exist, at element 306 the computer system determines a start radius and assigns the start radius as the current radius. In some embodiments, the computer system determines the start radius based on an entity threshold requirement (a number of entities to be returned by the geolocation query). For example, if the entity threshold requirement is 100 entities and the user is located in a densely populated city, the computer system select a start radius of 0.5 miles. In some embodiments, the computer system arbitrarily selects a start radius. For example, the computer system may select a start radius of 5 miles. In some embodiments, the start radius is manually selected. For example, a system administrator manually selects the start radius based on observing the data distribution (e.g., based on observing the location of the requesting user's device). In other embodiments, the computer system automatically selects a start radius based on a pre-calculated data distribution and a maximum distance for a particular query. For example, the computer system may select a start radius that is 10% of a max distance. If certain types of data is given weight based on its data distribution (e.g., searching for nearby merchants that offer promotions), then the computer system will automatically calculate a start radius that is 20% of the maximum distance of the particular query, for example. Once the start radius has been determined and assigned as the current radius, the flow proceeds to element 310, in the illustrated embodiment.

At element 304, if a cached start radius exists, the computer system assigns the start radius stored in the cache as the current radius at element 308. The computer system determines whether a cached start radius exists by using a search region key corresponding to the geographic location of the user. For example, a search region key corresponding to the user is in the following string format: "%.2f, %.2f, longitude, latitude." As one specific example, if the longitude and latitude coordinates indicating the geographic location of the user are "40.7817, −73.923511," then the search region key for this user device is "40.78, −73.92." In this specific example, the search region key is generated by rounding up a location's latitude and longitude values to two decimal places. At element 304, the computer system searched the database cache using the search region key of "40.78, −73.92" to determine a cached start radius having a similar "proper" radius to the center points of the adjacent search region key. For example, the cache will store a start radius with a key value that includes the latitude and longitude of a previous search region rounded up to the nearest two decimal places. Consequently, in this example, the computer system will search in the database for a search region key that matches the search region key of "40.78, −73.92" of a current user location in order to use the search radius of previous geolocation queries having a matching search region key.

At element 310, in the illustrated embodiment, the computer system queries geographic database 150 using the current radius (e.g., either the cached start radius or the start radius determined at element 306). At element 312, if the current radius is equal to a threshold radius, then the method proceeds to element 318. At element 318, the computer system determines whether the current radius does not exist or if the current radius is not equal to the cached radius; if either are true, the flow proceeds to element 322 where the computer system stores the current radius in place of the cached radius (the computer system caches the current radius as the "start" radius for future geolocation queries). If, however, neither of the conditions at element 318 are true, then the flow proceeds to element 324 where the flow ends.

At element 312, if the current radius is equal to the threshold radius, then the computer system proceeds to element 314 where the computer system determines whether the results of the geolocation query executed at element 310 satisfy an entity threshold requirement. For example, at element 314, if the geolocation query executed at 310 returns a number of entities that is greater than or equal to the entity threshold requirement, the flow proceeds to element 316. If, however, the geolocation query does not return a threshold number of entities, the flow proceeds to element 320, where the computer system increases the current radius by a specific step length (e.g., by a predetermined amount). Examples of geolocation query results that do and do not satisfy an entity threshold requirement are discussed in further detail below with reference to FIG. 4. In some embodiments, if the query results surpass the entity threshold requirement by more than a certain amount, then the computer system decreases the current radius by the step length at element 320. An example search performed with a decreased radius is discussed in further detail below with reference to FIG. 5. After element 320 is completed, the flow returns back to element 310 where the query is performed again using the increased radius length. At element 314 if the query results satisfy the entity threshold requirement, the flow proceeds to element 316. At element 316, the computer system assigns the distance from a k-nearest point (a location of the threshold entity) to a center point (location of the user) of the search region as the current radius in the database cache. After assigning the new current radius, the flow proceeds to element 318.

FIG. 3B is a diagram illustrating example search regions determined using the method of FIG. 3A for both dense and sparsely-populated areas. In the illustrated embodiment, a dense area 330 is shown in the upper portion of FIG. 3B, while a sparse area 340 is shown in the lower portion of FIG. 3B. Dense area 330, in the illustrated embodiment, includes various entities 338, several of which are located within a search region 334A generated based on a search radius 332A determined using the method 300 shown in FIG. 3A. For example, search region 334A encompasses a threshold number of entities 338 that satisfy an entity threshold requirement. In the illustrated embodiment, the search region 334A for dense area 330 encompasses 20 entities (i.e., the geolocation query performed using search radius 332A returns the locations of 20 different entities). The center of search region 334A is the location 336A of a user for which the geolocation query corresponding to search radius 332A is being performed. In this example, the entity threshold requirement is 20 and, therefore, the number of entities within search region 334A satisfies the entity threshold requirement.

In some situations, less densely populated areas (such as sparse area 340) require a larger search radius than radius 332A. As shown in the bottom portion of FIG. 3B, a sparse area 340 (an area with less entities that are farther distances from one another) requires a search radius 332B that is larger than the search radius 332A utilized in dense area 330 to perform a geolocation query. In this example, search radius 332B is more than twice the length of search radius 332A, making search region 334B more than twice the area of search region 334A. Thus, in order to satisfy the entity threshold requirement (e.g., a query must return 20 or more entities), the search region 334B for sparse area 340 is much larger than the search region 334A for the densely populated area 330. In the illustrated embodiment, search region 334B for sparse area 340 encompasses 30 entities, which satisfies the entity threshold requirement of 20 entities.

Example Search Region Alteration

FIG. 4 is a diagram illustrating an example of increasing a search region for a given geospatial query. In the illustrated embodiment, the top portion of example 400 includes a first set of query parameters 402A and a corresponding search region 434A generated in a geographic area based on query parameters 402A. The bottom portion of example 400, in the illustrated embodiment, includes a second, altered set of query parameters 402B and a corresponding search region 434B generated in the same geographic area as search region 434A.

The first set of query parameters 402A, in the illustrated embodiment, include several parameters for performing a geolocation query for a given user. Query parameters 402A include a latitude "40.75777" and longitude −73.98222" indicating the location of a user computing device (e.g., located at the center of search region 434A), a search region key "40.75−73.98" (corresponding to the latitude and longitude of the user computing device, rounded to two decimal places), a cached radius (in this cache there is not a previously generated and cached radius with a search region key matching the search region key of "40.75−73.98"), a current search radius 432A of "0.25" and an entity count threshold requirement of 70. In this example, the disclosed system executes a geolocation query based on the first set of query parameters 402A. Specifically, in this example, the geolocation query is executed with a search radius of 0.25, which results in an entity count of 30 entities; this entity count does not meet the entity threshold requirement of 70 entities 438. Therefore, the computer system increases the search radius by a step amount of 0.25 miles.

The second set of query parameters 402B that result from increasing the search radius from 0.25 miles to 0.5 miles results in a search region 434B which is twice the size of the search region 434A shown in the upper portion of FIG. 4. The larger search region 434B shown in the lower portion of FIG. 4 encompasses 73 entities 438, which satisfies the entity threshold requirement of 70 entities (specified in the second query parameters 402B). The geolocation queries executed in the examples of FIGS. 3A-4 are KNN queries.

In the illustrated embodiment, the second set of query parameters 402B, generated by a computer system (e.g., computer system 100 shown in FIG. 1) include a cached radius of 0.5 miles. For example, after determining that a geolocation query, executed using search radius 432B (of 0.5 miles), returns a number of entities that satisfies the entity threshold requirement, the computer system stores the search radius of 0.5 miles for future searches in this geographic location. The computer system caches the search radius of 0.5 miles with a search region key of "40.75–73.98," which will be compared with the locations of future users that search in this geographic area. For example, the cached radius of 0.5 miles will be retrieved for users whose geographic locations have coordinates that, when rounded to two decimal places have the same search region key as the cached search radius. If there is a match between the search region key of the cached search radius and the search region key corresponding to a given user's current location, then the computer system will use the cached radius as a starting search radius when performing geolocation queries for the given user.

In some embodiments, the disclosed computer system increases the search radius 432A multiple times before an entity count returned by a geolocation query performed using the increased search radius satisfies the entity threshold requirement. For example, if the search is being performed in a geographic location that has very few entities, the disclosed computer system may need to increase the search radius by a specific step amount five, ten, fifteen, etc. number of times before the search region encompasses a number of entities that satisfies the entity threshold requirement. Due to the computer system caching the final search radius (e.g., the radius of 0.5 miles that returned an adequate number of entities as discussed in the example above relative to FIG. 4), future geolocation queries for users in a similar location to the location of the cached search radius will be exponentially more efficient than the queries requiring many changes in the search radius. In this specific example, queries executed using a cached radius will be approximately 2, 5, 10, etc. times faster than queries executed for a geographic location that does not have a cached query (e.g., executed within 5 milliseconds instead of 55 milliseconds). In some situations, this may advantageously improve user experience in addition to satisfying service level agreements (SLAs) with limitations on the amount of time allowed between a user request and a response from the disclosed system.

FIG. 5 is a diagram illustrating an example of decreasing a search region for a given geospatial query. In the illustrated embodiment, an example 500 of decreasing a search region due to an increase in the number of entities located in a given geographical area is shown. In the illustrated embodiment, the first set of query parameters 502A has a search radius 532B of size 0.1 miles, resulting in a search region 534A encompassing six entities 538. This search result satisfies the entity threshold requirement of five entities. At a later point in time a second geolocation query is performed in the same location as the query performed using the first set of query parameters 502A. Note that the second set of query parameters 502B is the same as the first set of query parameters 502A. The number of entities located in the same geographic location has increased significantly, however, resulting in a search result of 19 entities. This result surpasses the entity threshold requirement more than an allowed amount. For example, if search results return five or more entities over the amount specified by the entity threshold requirement, then the system will decrease the search radius and perform an updated search. In the illustrated embodiment, a third set of query parameters 502C includes a search radius 532C of 0.05 miles (half the search radius of the first two searches shown in FIG. 5). The computer system decreases the search radius of 0.1 miles by a step amount of 0.05 miles, to achieve a search radius of 0.05 miles. A geolocation query performed using the radius of 0.05 miles results in a search region 534C that encompasses nine entities, which meets the entity threshold requirement of 5, but does not surpass the threshold by more than four entities. The computer system updates the cached radius by storing the radius of 0.05 miles from the third set of query parameters 502C in a database cache.

Example Method

FIG. 6 is a flow diagram illustrating an example method for determining a minimum search region with a threshold number of entities within the minimum search region, according to some embodiments. The method shown in FIG. 6 may be used in conjunction with any of the computer circuitry, systems, devices, elements, or components disclosed herein, among other devices. In various embodiments, some of the method elements shown may be performed concurrently, in a different order than shown, or may be omitted. Additional method elements may also be performed as desired. According to various embodiments, some or all elements of FIG. 6 may be performed by system 100. In some embodiments, method 600 determines a minimum search region having a threshold number of entities located within the minimum search region.

At 610, in the illustrated embodiment, a computer system selects, based on a geographic location of a user computing device, a first search region, where the geographic location of the user computing device corresponds to a center point of the first search region. In some embodiments, computer system 110 executes query module 120 to perform element 610. In some embodiments, the computer system determines the geographic location corresponding to the user computing device. In some embodiments, the determining is performed based on one or more types of the following types of information: a global positioning system (GPS) location of the user computing device, an internet protocol (IP) address of the user computing device, and location information entered by a user into the user computing device. In some embodiments, in response to detecting that the user computing device has location tracking blocked, the computer system causing display of a prompt to enable location tracking at the user computing device. In some embodiments, the computer system determines, based on a user of the user computing device enabling location tracking, the geographic location of the user computing device.

At 620, the computer system executes, based on the first search region, a first query on a database storing geographic locations of a plurality of entities. In some embodiments, computer system 110 performs element 620 to execute first query 122 as shown in FIG. 1. In some embodiments, the plurality of entities includes a plurality of merchants, where the first query and the second query are further executed based on one or more query refinement parameters. In some embodiments, the query refinement parameters include one or more of the following types of parameters: current promotions offered by one or more of the plurality of merchants, whether a user of the user computing device previously interacted with one or more of the plurality of merchants, and whether one or more users corresponding to the user computing device previously interacted with one or more of the plurality of merchants.

At 630, the computer system increases the first search region by a specified amount to generate a second search region, where the increasing is performed based on determining that a number of entities returned by the first query does not satisfy an entity threshold requirement. In some embodiments, query module 120 executes step module 140 and search region module 130 to increase the first search region. In some embodiments, the computer system stores the second search region in a database cache, including storing the search region with a corresponding search region key, where the search region key includes a latitude and a longitude of the geographic location of the user computing device. In some embodiments, in response to comparing a geographic location of a second user device with the search region key stored in the database cache, the computer system retrieves, from the database cache, the second search region corresponding to the search region key. In some embodiments, the computer system executes a third query on the database based on the second search region retrieved from the database cache. In some embodiments, instead of increasing the first search region, the computer system decreases the second search region by the specified amount, where the decreased second search region encompasses a smaller area than an area covered by the second search region.

In some embodiments, in response to determining that a number of entities returned by the third query does not satisfy the entity threshold requirement, the computer system iteratively performs, until a number of entities returned by new queries satisfies the entity threshold requirement, the following actions: increasing the second search region by the specified amount to generate a new search region and executing, based on the new search region, a new query on the database storing the geographic locations of the plurality of entities. In some embodiments, the computer system determines that a number of entities returned by the third query does not satisfy the entity threshold requirement and that the second search region is greater than or equal to a specified maximum search region. In some embodiments, based on the specified maximum search region being met, the computer system causes display, at the user computing device, of the entities returned by the third query.

At 640, the computer system executes a second query on the database based on the second search region. In some embodiments, query module 120 performs element 640 to execute second query 126 as discussed in detail above with reference to FIG. 1. In some embodiments, the first and the second queries are k-nearest neighbor (kNN) search queries, where the minimum search region is a circle with a minimum radius that encompasses a number of entities that satisfies the entity threshold requirement. In some embodiments, the geographic locations of the plurality of entities are determined based on one or more of internet protocol (IP) addresses or zip codes of respective ones of the plurality of entities.

At 650, in response to the second query returning a number of entities that satisfy the entity threshold requirement, the computer system causes display, at the user computing device, of the entities returned by the second query. In some embodiments, computer system 110 performs element 650 to transmit entities 112B to user computing device 102 as discussed above with reference to FIG. 1. In some embodiments, the second search region is an updated search region and the first region is a start region. In some embodiments, the computer system replaces the start search region that is stored in the cache with the updated search region. In some embodiments, the replacing includes storing the updated search region with a corresponding search region key, where the search region key includes a latitude and a longitude of the geographic location of the user computing device.

In some embodiments, the computer system performs the selecting based on identifying that an electronic communication processing application has been opened on the user computing device. In some embodiments, the computer system receives, from the user computing device based on causing display of the entities returned by the second query a request to perform an electronic communication via the processing application with one or more of the entities returned by the second query. In some embodiments, the one or more entities are one or more merchants, and the electronic communication is an electronic transaction between a user of the user computing device and the one or more merchants.

Example Query Parameter Caching for Geospatial Cells

In addition to performing self-adaptive queries as discussed above with reference to FIGS. 1-6, the disclosed techniques perform caching of query parameters for current queries for efficient use in future queries for computing devices having similar locations to devices for which the current queries were executed. The disclosed query caching techniques implement geospatial cells which systematically separate various parts of the world into geospatial cells that encompass a portion of the world, Mars, various planets, etc. For example, geospatial cells are used to determine that a second user computing device is located in a similar location to a first user computing device for which a geolocation query was performed. In this example, instead of the two devices needing to have an identical location, the disclosed techniques identify that the same (or similar) query parameters can be used for the second computing device based on the second device being located in the same geospatial cell as the first device. Such techniques may advantageously reduce the amount of computing resources necessary to locate a specific number of entities for the second computing device by reducing the number of queries necessary (e.g., only one query will be executed for a given computing device instead of several). The disclosed query caching techniques may improve user experience by providing query results more quickly than querying techniques that do not implement caching.

Turning now to FIG. 7, a block diagram is shown illustrating an example system configured to cache query parameters for geospatial cells. In some embodiments, system 700 is the same as system 100. In other embodiments, system 700 is a different system than system 100, but includes similar components and executes similar functionalities to system 100. For example, system 700 includes the same computer system 110, with query module 120 (with modules 130, 140, and 160) as well as geographic database 150, as system 100. In contrast, however, system 700 includes a query cache 760 and a geospatial cell module 730 within computer system 110 in addition to query module 120.

Computer system 110, in the illustrated embodiment, receives location information 104 from user computing device 102 and executes geospatial cell module 730 and query cache 760 to locate entities 712 for display at the user computing device 102. Computer system 110 executes query module 120 to identify, based on the location information 104 of device 102, that user computing device 102 is located in a first geospatial cell of a plurality of geospatial cells stored in query cache 760. After identifying that device 102 is located in the first geospatial cell, query module 120 determines whether query parameters, for a query previously performed for a device located in the first geospatial cell, are stored in the query cache 760. As shown in the illustrated embodiment, query module 120 uses a geospatial cell identifier (ID) 762A to search query cache 760 for previously stored query parameters. As discussed in further detail below with reference to FIG. 8, query cache 760 stores query parameters with a geospatial cell ID to which the parameters correspond.

In various embodiments, computer system 110 executes geospatial cell module 730 to generate and store coordinates for a plurality of geospatial cells. In some embodiments, computer system 110 stores the coordinates for the geospatial cells in geographic database 150. In other embodiments, computer system 110 stores the coordinates for the geospatial cells in query cache 760. In addition to generating and storing coordinates for geospatial cells, geospatial cell module 730 may receive query parameters 764A-N for the geospatial cells 732A-N from query module 120 and store the parameters in the query cache 760 in rows with their corresponding geospatial cell ID 762 as discussed in further detail below with reference to FIG. 8.

Query cache 760, in the illustrated embodiment, returns query parameters 764A corresponding to geospatial cell ID 762A to query module 120 based on the geospatial cell ID 762A specified in the query submitted by query module 120 to query cache 760. Query module 120, in the illustrated embodiment, utilizes search region module 130 to determine a search region for querying geographic database 150. For example, query parameters 764A include a search radius and an entity threshold requirement for the first geospatial cell identified by ID 762A. Query module 120 uses the search radius to generate a search region area that encompasses the location of user computing device 102. For example, query module 120 generates a circle that has a radius that is the length of the search radius included in query parameters 764A and that has a center point of the geographic location (latitude and longitude) of user computing device 102.

Query module 120, in the illustrated embodiment, executes query 722 on geographic database 150 according to the search region generated by search region module 130 for user computing device 102. In the illustrated embodiment, database 150 returns entities 712 for query 722. Query module 120 determines whether the number of entities 712 satisfies an entity threshold requirement determined via entity threshold module 160. As discussed with reference to FIG. 1, query module 120 executes step module 140 and entity threshold module 160 to determine whether a number of entities returned by a query, such as query 722, satisfy query requirements.

In various embodiments, if query module 120 is utilizing query parameters 764A, retrieved from query cache 760, to perform queries on database 150, these queries are likely to return a number of entities that satisfies entity threshold requirements. If, however, query 722 does not satisfy an entity threshold requirement generated by entity threshold module 160, then query module 120 executes step module 140 and search region module 130 to alter the search region generated based on query parameters 764A and used to execute query 722. For example, if an area corresponding to a geospatial cell has increased in entity population density since a previous query (corresponding to query parameters 764A) was performed on database 150, then query 722 will return too many entities (a number that is much larger than an entity threshold). As a result, in this example, query module 120 will decrease the size of the search region using search region module 130 and execute another, different query to return a smaller number of entities than query 722.

Computer system 110, in the illustrated embodiment, transmits entities 712 (returned using cached parameters 764A) to user computing device 102. User computing device 102, in the illustrated embodiment, displays entities 712 via user interface 106 to a user of device 102. The list of entities 712 returned by query 722 and transmitted to user computing device 102 may be very similar to a list of entities returned by a previous query (that resulted in query parameters 764A being cached in query cache 760). As one specific example, a first and second user are located 75 feet apart in Times Square in New York City and open their transaction processing applications (e.g., Venmo™) 30 seconds apart. In this example, computer system 110 will use the query parameters used for the first user to execute a query for the second user (that opened the application 30 seconds after the first user) due to these users having overlapping geographic areas. In this way, system 700 is able to perform less queries for a given user and quickly return a list of entities to the device of the user that are geographically near the user.

In some embodiments, in addition to storing query parameters for a plurality of geospatial cells, computer system 110 stores the results of a query performed for the geospatial cells. For example, in addition to storing a query radius and entity threshold requirement for a given geospatial cell based on a query performed for a first user to enter this geospatial cell, computer system 110 stores the locations of the entities returned by the query performed for the first user. In such embodiments, in response to a second user entering the given geospatial cell, computer system 110 retrieves the list of entity locations stored in the query cache 760 and transmits this list to user computing device 102 for display to the second user via user interface 106. For example, in some situations, instead of using cached query parameters to perform a new query for a new user located within a geospatial cell, the disclosed techniques return a cached list of entities that was retrieved for a user previously located in the geospatial cell.

Figure 8:
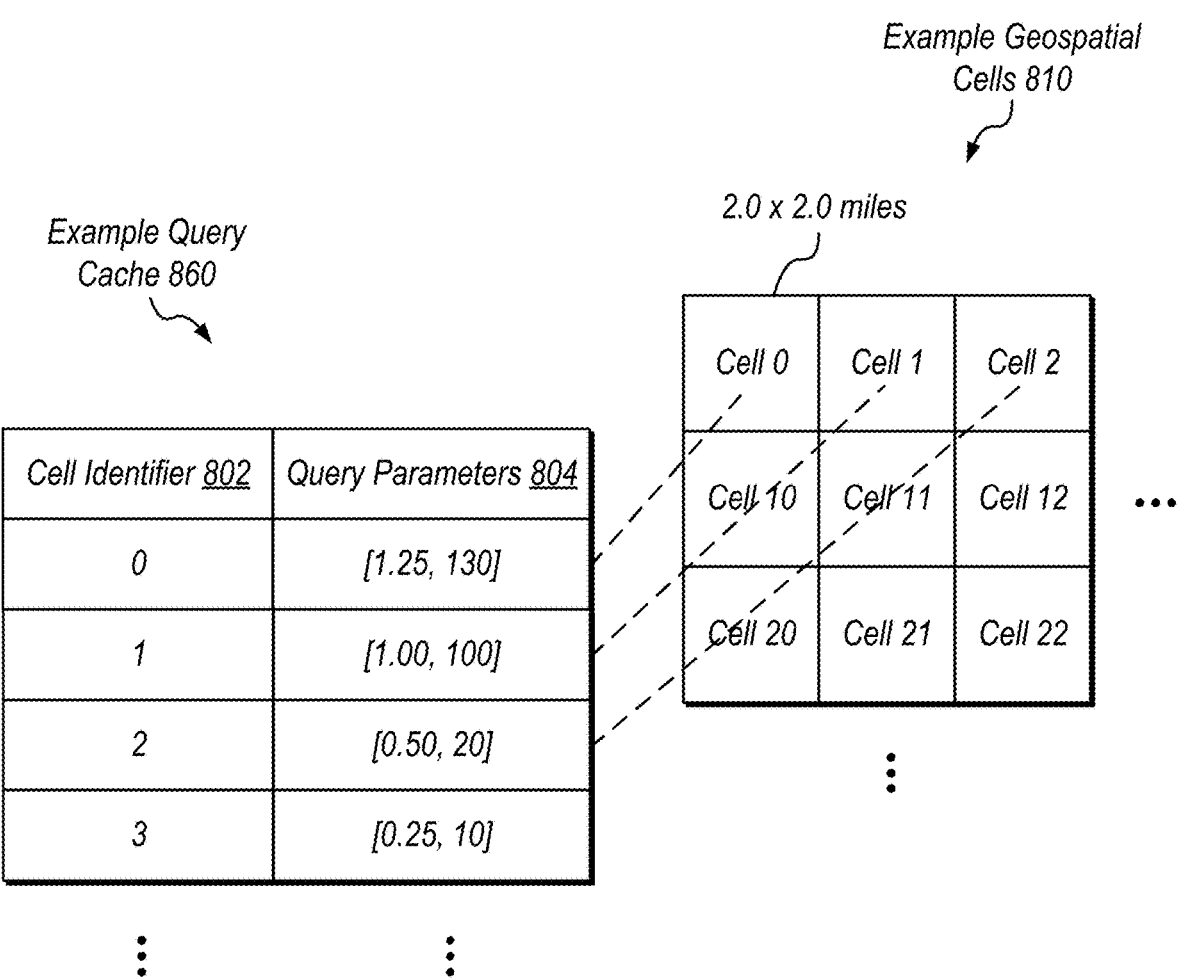
FIG. 8 is a block diagram illustrating an example query cache and geospatial cells, according to some embodiments.

FIG. 8 is a block diagram illustrating an example query cache and geospatial cells. Query cache 860 is one example of query cache 760 shown in FIG. 7 and discussed above. In the illustrated embodiment, example geospatial cells 810 are shown that are each a two-by-two mile square. For example, geospatial cells 810 may be overlaid on a map of the world. As one specific example, cell 0 may cover a two-by-two square mile area in Austin, Texas, while cell "1" covers a two-by-two square mile area just to the right of the area covered by cell 0. In various embodiments, geospatial cells 810 are not exact squares. For example, edges of the cells are curved in some situations because they follow spherical geodesics due to the Earth being an ellipsoid. In disclosed calculations, however, geospatial cells 810 are often treated as squares for ease of calculation. In the illustrated embodiment, query cache 860 stores query parameters for various ones of the example geospatial cells 810. Specifically, query cache 860 includes two columns: a cell identifier 802 column and a query parameters 804 column. Query cache 860, in the illustrated embodiment, includes a first row storing query parameters 804 for a geospatial cell identified by a cell identifier 802 of "0": a search radius of 1.25 miles and an entity threshold requirement of 130 entities. Similarly, the second row of query cache 860 stores a query search radius of 1.00 miles and an entity threshold requirement of 100 entities for geospatial cell 1. In some embodiments, query cache 860 stores a search region for respective geospatial cells instead of a search radius. For example, query parameters 804 for each cell may store dimensions of areas (such as a square) specifying search regions for queries to be performed for user computing devices located within the geospatial cells.

Figure 9:
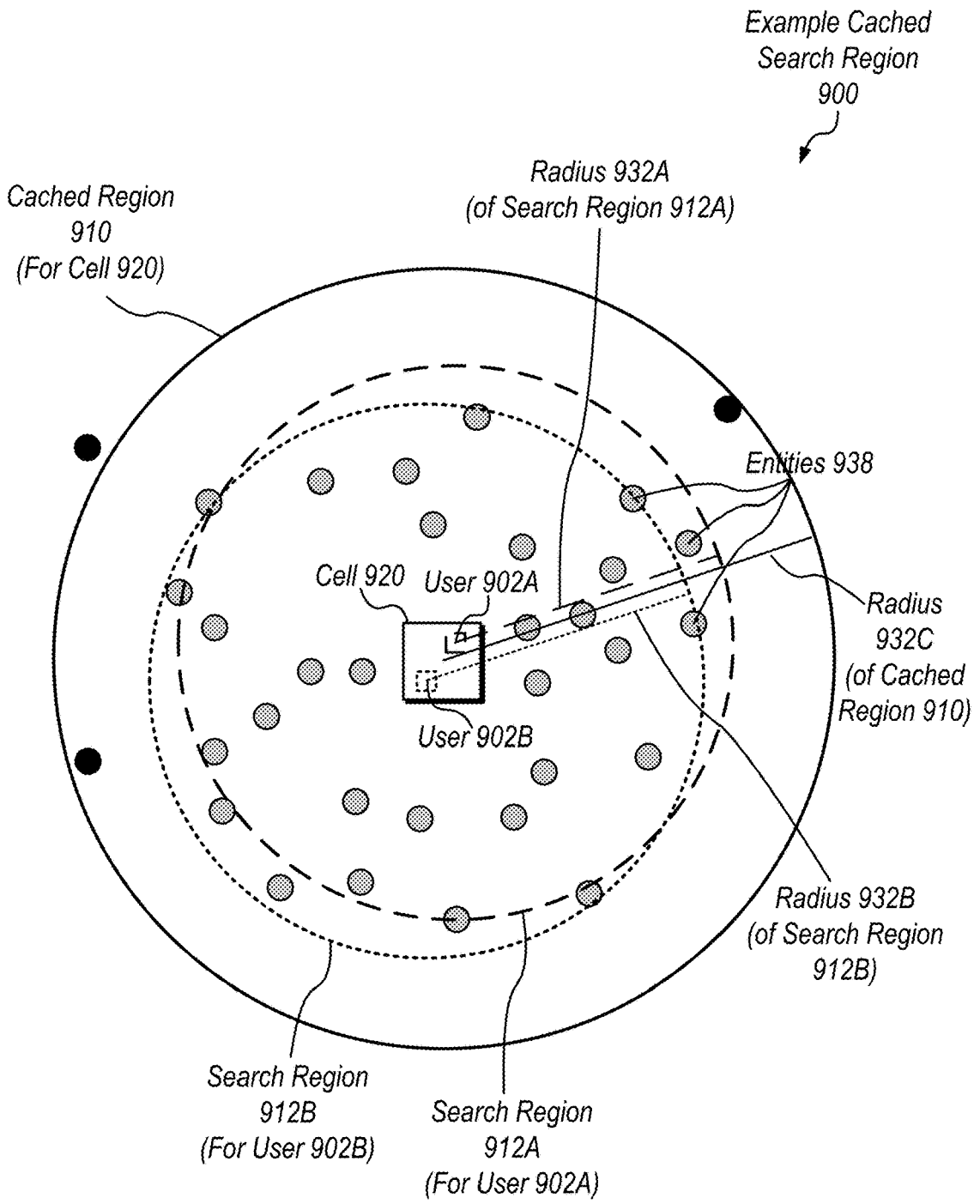
FIG. 9 is a diagram illustrating an example cache search region, according to some embodiments.

FIG. 9 is a diagram illustrating an example cache search region. In the illustrated embodiment, example cached search region 900 includes a geospatial cell 920, a cache region 910 for a geospatial cell 920, entities 938, and two different users 902A and 902B. In the illustrated embodiment, a cache region 910 for a geospatial cell 920 is shown to encompass two search regions for two different users 902A and 902B located within geospatial cell 902. A search region 912A is shown in the illustrated embodiment for the first user 902A located in geospatial cell 920 and has a radius 932A. Further, in the illustrated embodiment, a second search region 912B for user 902B, located within geospatial cell 920, is shown having a radius 932B. Radius 932C of cache region 910 is one example of the query parameters 764A that may be determined for geospatial cell identifier by cell ID 762A. Search regions 912A and 912B are two examples of query search regions that may be determined by query module 120 based on query parameters 764A (i.e., based on search radius 832C) of the geospatial cell 762A discussed above with reference to FIG. 7. In FIG. 8, two different search regions 912A and 912B are determined—for two different users 902A and 902B having slightly different locations but both located within geospatial cell 920—based on the radius 932C cached for geospatial cell 920.

FIG. 10 is a diagram illustrating an example cache region determination for a geospatial cell. In the illustrated embodiment, an example 1000 of a cache region determination is shown. In the illustrated embodiment, a geospatial cell 1020 with a center point 1002, a result cache region radius of 1050, and a cache region 1010 for geospatial cell 1020 are shown. Further, in the illustrated embodiment, a current center point 1004 of a user computing device (e.g., device 102 shown in FIGS. 1 and 7) and a query radius of 1040 are shown. Throughout the illustrated embodiment, various entities 1038 are shown as well.

In the illustrated embodiment, query parameters for an input query (e.g., query 722) are shown including a radius of 5 miles and an entity threshold of five entities. In the illustrated embodiment, cached radius 1050 is determined by taking the input query radius (5 miles) and adding this value to half the length of the geospatial cell's diagonal 1022. The resulting cache region 1010 corresponding to the cached radius 1050 supports queries with a search radius that is less than or equal to 5 miles. For example, the cache region encompasses an area that will satisfy all queries for devices with a center point within the geospatial cell 1020. In the illustrated embodiment, a current center point 1004 of a user and the cached radius 1050 is used to determine a query radius 1040 for the user computing device located at the current center point 1004 within geospatial cell 1020. The resulting smallest region 1060 to be searched for a current query returns an entity count of eight entities 1038, which satisfies the entity threshold requirement of five for the input query.

Figure 11:
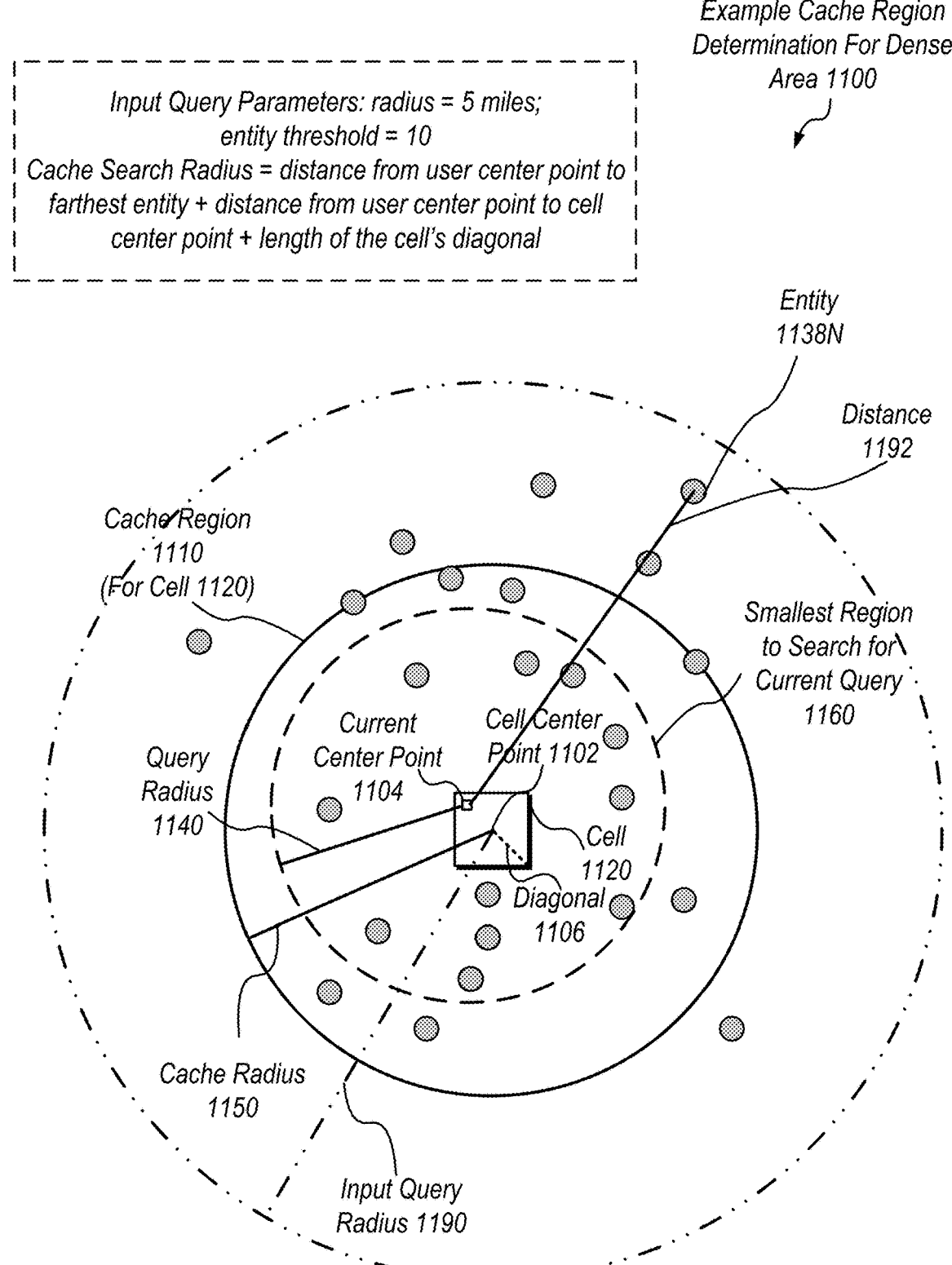
FIG. 11 is a diagram illustrating an example cache region determination for a geospatial cell corresponding to a dense geographic area, according to some embodiments.

FIG. 11 is a diagram illustrating an example cache region determination for a geospatial cell corresponding to a dense geographic area. In the illustrated embodiment, an example 1100 of a cache region determination for a dense area is shown. The resulting cache region 1110 determined using the disclosed techniques is smaller than the cache region 1010 shown in FIG. 10, because geospatial cell 1120 is located in a geographic location that is more densely populated than the geographic location in which geospatial cell 1020 is located. A geospatial cell 1120 is shown at the center of a cache region 1110 determined for cell 1120. A diagonal 1106 for geospatial cell 1120 as well as a cache radius 1150 for cache region 1110 are shown in the illustrated embodiment. The determined cache radius 1150 supports queries for devices located within geospatial cell 1120 that have an entity threshold requirement of 10 entities. Said another way, KNN queries with an entity limit of less than or equal to 10 entities for devices located at any point within geospatial cell 1120 can be executed within the resulting cache region 1110 shown in FIG. 11. Note that the resulting cache region is smaller than the region encompassed by the input query radius 1190 of 5 miles.

The disclosed system (e.g., system 700) determines a cache search radius 1150 by adding: the distance from a current user's center point 1104 to a farthest entity (e.g., entity 1138N) within the search region generated via input query radius 1190 (this distance is represented by distance 1192 in FIG. 11), the distance from a current user center point 1104 to the distance from center point 1104 to cell center point 1102, and the length of the cell's diagonal 1106. As one specific example, the distance 1192 from the user's center point 1104 to the farthest entity is 3 miles, the distance from user center point 1104 to cell center point 1102 is 0.5 miles, and the length of the cell's diagonal 1106 is 0.2 miles, then a resulting cache search radius 1150 for geospatial cell 1120 is 3.7 miles (3+0.5+0.2).

Example Method

FIG. 12 is a flow diagram illustrating a method for caching query parameters for geospatial cells for performing similar geolocation queries, according to some embodiments. The method shown in FIG. 12 may be used in conjunction with any of the computer circuitry, systems, devices, elements, or components disclosed herein, among other devices. In various embodiments, some of the method elements shown may be performed concurrently, in a different order than shown, or may be omitted. Additional method elements may also be performed as desired. According to various embodiments, some or all elements of FIG. 12 may be performed by system 100. The method 1200 may improve geospatial query efficiency by caching query parameters for queries previously performed for a similar location to that of a current user for which a query is to be performed.

At 1210, in the illustrated embodiment, a computer system receives, from a user computing device, a request to access geolocation information for a plurality of entities. In some embodiments, computer system 110, shown in FIG. 7, performs element 1210. In some embodiments, the plurality of entities are merchants, where the geolocation query is further executed based on one or more query refinement parameters including one or more of the following types of parameters: current promotions offered by the merchants, whether a user of the user computing device previously interacted with the merchants, and whether one or more users corresponding to the user computing device previously interacted with the merchants.

At 1220, the computer system determines, based on the request, a first geographic location of the user computing device. In some embodiments, query module 120, shown in FIG. 7, determines the location of user computing device 102 based on the location information 104 of the device. In some embodiments, determining the first geographic location of the user computing device is performed based on one or more types of the following types of information: a global positioning system (GPS) location of the user computing device, an internet protocol (IP) address of the user computing device, and location information entered by a user into the user computing device.

In some embodiments, prior to receiving the request to access geolocation information, the computer system determines query parameters for a plurality of different geospatial cells and stores the query parameters in a database cache, where determining the query parameters for a given geospatial cell includes calculating a radius for the given geospatial cell. In some embodiments, the computer system calculates the radius for the given geospatial cell by dividing a length of a diagonal of the geospatial cell by two and adding a predetermined minimum radius to the result of the dividing. For example, the computer system determines a smallest possible search region that would encompass (satisfy) search regions for queries performed for users located in different locations (e.g., all possible points) within the geospatial cell and stores query parameters corresponding to the smallest possible search region.

In some embodiments, prior to receiving the request to access geolocation information, the computer system determines query parameters for a plurality of different geospatial cells and storing the query parameters in the database cache. In some embodiments, determining the query parameters for a given geospatial cell includes determining whether a geographic area encompassed by the given geospatial cell is a densely populated area based on comparing a number of entities within the given geospatial cell with an entity threshold requirement. In some embodiments, in response to determining that the given geospatial cell is a densely populated area, the computer system calculates a radius for the given geospatial cell by calculating the sum of: a distance from a center point of a user computing device within the given geospatial cell to a center point of the given geospatial cell, a distance from the center point of the given geospatial cell to a location of an entity within the given geospatial cell, where the entity corresponds to an entity threshold requirement, and a length of a diagonal of the given geospatial cell.

At 1230, the computer system identifies that the first geographic location is located within a given geospatial cell of a plurality of geospatial cells stored in a database cache. In some embodiments, query module 120 determines that query cache 760 stores information for the given geospatial cell. In some embodiments, prior to receiving the request to access geolocation information, the computer system determines query parameters for a plurality of geospatial cells and retrieves, from the database based on respective query parameters, geographic locations of entities located within the plurality of geospatial cells, where respective ones of the geographic locations include a latitude and longitude of a given entity. In some embodiments, prior to receiving the request to access geolocation information, the computer system further stores, based on determining that results of the retrieving satisfy an entity threshold requirement, the query parameters in a database cache, where a given entry in the database cache includes a cache key storing a cell number of a geospatial cell corresponding to the given entry and a cache value storing cache parameters for the geospatial cell. In some embodiments, the cache parameters include a search region radius for the geolocation query and an entity threshold requirement for the geolocation query. For example, the database cache stores at least a subset of a set of information stored in the database. In some situations, the both the database cache and the backend database store query parameters determined for a plurality of different geospatial cells.

At 1240, the computer system determines, based on the first geographic location being located within the given geospatial cell, whether cached query parameters for locating a plurality of entities within the given geospatial cell are stored in the database cache. In some embodiments, query module 120 determines that query cache 760 stores query parameters corresponding to the given geospatial cell. In some embodiments, the cached query parameters corresponding to the given geospatial cell are generated based on a query previously performed, for another user computing device previously located in the given geospatial cell, on the database storing location information for a plurality of entities. In some embodiments, the geographic location of the user computing device is different from the geographic location of the other user computing device located within the given geospatial cell. For example, different users located in a similar geographic location (e.g., within the same geospatial cell) can share cached query parameters to provide similar query results to the two different users event though their locations slightly differ (e.g., they do not have identical geographical coordinates).

At 1250, the computer system retrieves, based on determining that the database cache stores query results, the cached query parameters. In some embodiments, query module 120 retrieves query parameters from query cache 760 and inputs the retrieved parameters to search region module 130 as discussed above with reference to FIG. 7. In some embodiments, a given entry in the database cache includes a cache key storing a cell number of a geospatial cell corresponding to the given entry and a cache value storing cache parameters for the geospatial cell, where cache parameters include a search region radius for the geolocation query and an entity threshold requirement for the geolocation query.

At 1260, the computer system executes, based on the cached query parameters, a geolocation query on a database storing location information for different entities, where results of the geolocation query are different from query results of one or more other queries executed, based on the cached query parameters, for other user computing devices located within the given geospatial call based on the cached query parameters. In some embodiment, query module 120 performs element 1260 to execute query 722 on geographic database 150 as shown in FIG. 7. In some embodiments, the geolocation query is a k-nearest neighbor (kNN) query.

In some embodiments, the computer system receives, from a second user computing device, a second request to access geolocation information for a plurality of entities and determines, based on the second request, a geographic location of the second user computing device. In some embodiments, the computer system identifies that the geographic location of the second user computing device is located within the first geospatial cell in the database cache. In some embodiments, the computer system executes, based on the query parameters selected for the first request and stored in the database cache for the first geospatial cell, a geolocation query for the second request from the second user computing device. For example, the computer system may retrieve query parameters for a geospatial cell that were cached based on a different user previously requesting to execute a query from this geospatial cell.

Example Computing Device

Figure 13:
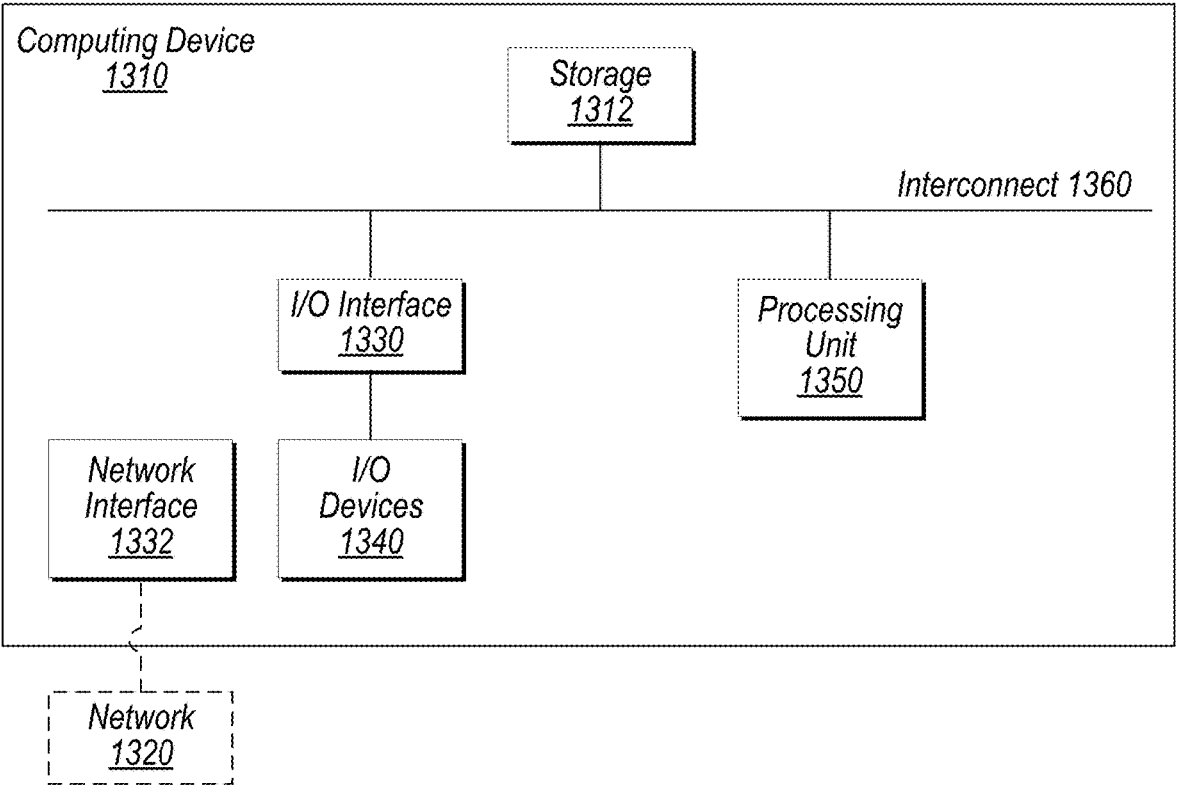
FIG. 13 is a block diagram illustrating an example computing device, according to some embodiments.

Turning now to FIG. 13, a block diagram of one embodiment of computing device 1310 (which may also be referred to as a computing system) is depicted. Computing device 1310 may be used to implement various portions of this disclosure. Computing device 1310 may be any suitable type of device, including, but not limited to, a personal computer system, desktop computer, laptop or notebook computer, mainframe computer system, web server, workstation, or network computer. The computer system 110 and user computing device 102 shown in FIG. 1 and discussed above, are different examples of computing device 1310. As shown in FIG. 13, computing device 1310 includes processing unit 1350, storage 1312, and input/output (I/O) interface 1330 coupled via an interconnect 1360 (e.g., a system bus). I/O interface 1330 may be coupled to one or more I/O devices 1340. Computing device 1310 further includes network interface 1332, which may be coupled to network 1320 for communications with, for example, other computing devices.

In various embodiments, processing unit 1350 includes one or more processors. In some embodiments, processing unit 1350 includes one or more coprocessor units. In some embodiments, multiple instances of processing unit 1350 may be coupled to interconnect 1360. Processing unit 1350 (or each processor within 1350) may contain a cache or other form of on-board memory. In some embodiments, processing unit 1350 may be implemented as a general-purpose processing unit, and in other embodiments it may be implemented as a special purpose processing unit (e.g., an ASIC). In general, computing device 1310 is not limited to any particular type of processing unit or processor subsystem.

Storage subsystem 1312 is usable by processing unit 1350 (e.g., to store instructions executable by and data used by processing unit 1350). Storage subsystem 1312 may be implemented by any suitable type of physical memory media, including hard disk storage, floppy disk storage, removable disk storage, flash memory, random access memory (RAM—SRAM, EDO RAM, SDRAM, DDR SDRAM, RDRAM, etc.), ROM (PROM, EEPROM, etc.), and so on. Storage subsystem 1312 may consist solely of volatile memory, in one embodiment. Database 350, discussed above with reference to FIG. 3 is an example of storage subsystem 1312. Storage subsystem 1312 may store program instructions executable by computing device 1310 using processing unit 1350, including program instructions executable to cause computing device 1310 to implement the various techniques disclosed herein.

I/O interface 1330 may represent one or more interfaces and may be any of various types of interfaces configured to couple to and communicate with other devices, according to various embodiments. In one embodiment, I/O interface 1330 is a bridge chip from a front-side to one or more back-side buses. I/O interface 1330 may be coupled to one or more I/O devices 1340 via one or more corresponding buses or other interfaces. Examples of I/O devices include storage devices (hard disk, optical drive, removable flash drive, storage array, SAN, or an associated controller), network interface devices, user interface devices or other devices (e.g., graphics, sound, etc.).

Various articles of manufacture that store instructions (and, optionally, data) executable by a computing system to implement techniques disclosed herein are also contemplated. The computing system may execute the instructions using one or more processing elements. The articles of manufacture include non-transitory computer-readable memory media. The contemplated non-transitory computer-readable memory media include portions of a memory subsystem of a computing device as well as storage media or memory media such as magnetic media (e.g., disk) or optical media (e.g., CD, DVD, and related technologies, etc.). The non-transitory computer-readable media may be either volatile or nonvolatile memory.

The present disclosure includes references to "an embodiment" or groups of "embodiments" (e.g., "some embodiments" or "various embodiments"). Embodiments are different implementations or instances of the disclosed concepts. References to "an embodiment," "one embodiment," "a particular embodiment," and the like do not necessarily refer to the same embodiment. A large number of possible embodiments are contemplated, including those specifically disclosed, as well as modifications or alternatives that fall within the spirit or scope of the disclosure.

This disclosure may discuss potential advantages that may arise from the disclosed embodiments. Not all implementations of these embodiments will necessarily manifest any or all of the potential advantages. Whether an advantage is realized for a particular implementation depends on many factors, some of which are outside the scope of this disclosure. In fact, there are a number of reasons why an implementation that falls within the scope of the claims might not exhibit some or all of any disclosed advantages. For example, a particular implementation might include other circuitry outside the scope of the disclosure that, in conjunction with one of the disclosed embodiments, negates or diminishes one or more of the disclosed advantages. Furthermore, suboptimal design execution of a particular implementation (e.g., implementation techniques or tools) could also negate or diminish disclosed advantages. Even assuming a skilled implementation, realization of advantages may still depend upon other factors such as the environmental circumstances in which the implementation is deployed. For example, inputs supplied to a particular implementation may prevent one or more problems addressed in this disclosure from arising on a particular occasion, with the result that the benefit of its solution may not be realized. Given the existence of possible factors external to this disclosure, it is expressly intended that any potential advantages described herein are not to be construed as claim limitations that must be met to demonstrate infringement. Rather, identification of such potential advantages is intended to illustrate the type(s) of improvement available to designers having the benefit of this disclosure. That such advantages are described permissively (e.g., stating that a particular advantage "may arise") is not intended to convey doubt about whether such advantages can in fact be realized, but rather to recognize the technical reality that realization of such advantages often depends on additional factors.

Unless stated otherwise, embodiments are non-limiting. That is, the disclosed embodiments are not intended to limit the scope of claims that are drafted based on this disclosure, even where only a single example is described with respect to a particular feature. The disclosed embodiments are intended to be illustrative rather than restrictive, absent any statements in the disclosure to the contrary. The application is thus intended to permit claims covering disclosed embodiments, as well as such alternatives, modifications, and equivalents that would be apparent to a person skilled in the art having the benefit of this disclosure.

For example, features in this application may be combined in any suitable manner. Accordingly, new claims may be formulated during prosecution of this application (or an application claiming priority thereto) to any such combination of features. In particular, with reference to the appended claims, features from dependent claims may be combined with those of other dependent claims where appropriate, including claims that depend from other independent claims. Similarly, features from respective independent claims may be combined where appropriate.

Accordingly, while the appended dependent claims may be drafted such that each depends on a single other claim, additional dependencies are also contemplated. Any combinations of features in the dependent that are consistent with this disclosure are contemplated and may be claimed in this or another application. In short, combinations are not limited to those specifically enumerated in the appended claims.

Where appropriate, it is also contemplated that claims drafted in one format or statutory type (e.g., apparatus) are intended to support corresponding claims of another format or statutory type (e.g., method).

Because this disclosure is a legal document, various terms and phrases may be subject to administrative and judicial interpretation. Public notice is hereby given that the following paragraphs, as well as definitions provided throughout the disclosure, are to be used in determining how to interpret claims that are drafted based on this disclosure.

References to a singular form of an item (i.e., a noun or noun phrase preceded by "a," "an," or "the") are, unless context clearly dictates otherwise, intended to mean "one or more." Reference to "an item" in a claim thus does not, without accompanying context, preclude additional instances of the item. A "plurality" of items refers to a set of two or more of the items.

The word "may" is used herein in a permissive sense (i.e., having the potential to, being able to) and not in a mandatory sense (i.e., must).

The terms "comprising" and "including," and forms thereof, are open-ended and mean "including, but not limited to."

When the term "or" is used in this disclosure with respect to a list of options, it will generally be understood to be used in the inclusive sense unless the context provides otherwise. Thus, a recitation of "x or y" is equivalent to "x or y, or both," and thus covers 1) x but not y, 2) y but not x, and 3) both x and y. On the other hand, a phrase such as "either x or y, but not both" makes clear that "or" is being used in the exclusive sense.

A recitation of "w, x, y, or z, or any combination thereof" or "at least one of . . . w, x, y, and z" is intended to cover all possibilities involving a single element up to the total number of elements in the set. For example, given the set [w, x, y, z], these phrasings cover any single element of the set (e.g., w but not x, y, or z), any two elements (e.g., w and x, but not y or z), any three elements (e.g., w, x, and y, but not z), and all four elements. The phrase "at least one of . . . w, x, y, and z" thus refers to at least one element of the set [w, x, y, z], thereby covering all possible combinations in this list of elements. This phrase is not to be interpreted to require that there is at least one instance of w, at least one instance of x, at least one instance of y, and at least one instance of z.

Various "labels" may precede nouns or noun phrases in this disclosure. Unless context provides otherwise, different labels used for a feature (e.g., "first circuit," "second circuit," "particular circuit," "given circuit," etc.) refer to different instances of the feature. Additionally, the labels "first," "second," and "third" when applied to a feature do not imply any type of ordering (e.g., spatial, temporal, logical, etc.), unless stated otherwise.

The phrase "based on" is used to describe one or more factors that affect a determination. This term does not foreclose the possibility that additional factors may affect the determination. That is, a determination may be solely based on specified factors or based on the specified factors as well as other, unspecified factors. Consider the phrase "determine A based on B." This phrase specifies that B is a factor that is used to determine A or that affects the determination of A. This phrase does not foreclose that the determination of A may also be based on some other factor, such as C. This phrase is also intended to cover an embodiment in which A is determined based solely on B. As used herein, the phrase "based on" is synonymous with the phrase "based at least in part on."

The phrases "in response to" and "responsive to" describe one or more factors that trigger an effect. This phrase does not foreclose the possibility that additional factors may affect or otherwise trigger the effect, either jointly with the specified factors or independent from the specified factors. That is, an effect may be solely in response to those factors, or may be in response to the specified factors as well as other, unspecified factors. Consider the phrase "perform A in response to B." This phrase specifies that B is a factor that triggers the performance of A, or that triggers a particular result for A. This phrase does not foreclose that performing A may also be in response to some other factor, such as C. This phrase also does not foreclose that performing A may be jointly in response to B and C. This phrase is also intended to cover an embodiment in which A is performed solely in response to B. As used herein, the phrase "responsive to" is synonymous with the phrase "responsive at least in part to." Similarly, the phrase "in response to" is synonymous with the phrase "at least in part in response to."

Within this disclosure, different entities (which may variously be referred to as "units," "circuits," other components, etc.) may be described or claimed as "configured" to perform one or more tasks or operations. This formulation—[entity] configured to [perform one or more tasks]—is used herein to refer to structure (i.e., something physical). More specifically, this formulation is used to indicate that this structure is arranged to perform the one or more tasks during operation. A structure can be said to be "configured to" perform some task even if the structure is not currently being operated. Thus, an entity described or recited as being "configured to" perform some task refers to something physical, such as a device, circuit, a system having a processor unit and a memory storing program instructions executable to implement the task, etc. This phrase is not used herein to refer to something intangible.

In some cases, various units/circuits/components may be described herein as performing a set of task or operations. It is understood that those entities are "configured to" perform those tasks/operations, even if not specifically noted.

The term "configured to" is not intended to mean "configurable to." An unprogrammed FPGA, for example, would not be considered to be "configured to" perform a particular function. This unprogrammed FPGA may be "configurable to" perform that function, however. After appropriate programming, the FPGA may then be said to be "configured to" perform the particular function.

For purposes of United States patent applications based on this disclosure, reciting in a claim that a structure is "configured to" perform one or more tasks is expressly intended not to invoke 35 U.S.C. § 112(f) for that claim element. Should Applicant wish to invoke Section 112(f) during prosecution of a United States patent application based on this disclosure, it will recite claim elements using the "means for" [performing a function] construct.

What is claimed is:

1. A method, comprising:
   determining, by a computer system, query parameters for a plurality of geospatial cells, including calculating a radius for respective ones of the plurality of geospatial cells, wherein calculating the radius for a given geospatial cell includes:
      dividing a length of a diagonal of the given geospatial cell by two; and
      adding a predetermined minimum radius to a result of the dividing;
   storing, by the computer system, the query parameters in a database cache;
   receiving, by the computer system from a user computing device, a request to access geolocation information for a plurality of entities;
   determining, by the computer system based on the request, a first geographic location of the user computing device;
   identifying, by the computer system, that the first geographic location is located within a first geospatial cell of the plurality of geospatial cells stored in the database cache;
   determining, by the computer system based on the first geographic location being located within the first geospatial cell, whether cached query parameters for locating a plurality of entities within the first geospatial cell are stored in the database cache, and
   retrieving, by the computer system based on determining that the database cache stores query results, the cached query parameters; and
   executing, by the computer system based on the cached query parameters, a geolocation query on a database storing location information for different entities, wherein results of the geolocation query are different from query results of one or more other queries executed, based on the cached query parameters, for other user computing devices located within the first geospatial cell based on the cached query parameters.

2. The method of claim 1, wherein the cached query parameters corresponding to the first geospatial cell are generated based on a query previously performed, for another user computing device previously located in the first geospatial cell, on the database storing the location information for the different entities.

3. The method of claim 2, wherein the first geographic location of the user computing device is different from a geographic location of the other user computing device located within the first geospatial cell.

4. The method of claim 1, wherein determining the query parameters for one or more of the plurality of geospatial cells further includes:
   determining whether a geographic area encompassed by a given geospatial cell is a densely populated area based on comparing a number of entities within a given geospatial cell with an entity threshold requirement.

5. The method of claim 4,
   in response to determining that the given geospatial cell is a densely populated area, the computer system calculating a radius for the given geospatial cell by calculating a sum of:
      a distance from a center point of a user computing device within the given geospatial cell to a center point of the given geospatial cell;
      a distance from the center point of the given geospatial cell to a location of an entity within the given geospatial cell, wherein the entity corresponds to the entity threshold requirement; and
      a length of a diagonal of the given geospatial cell.

6. The method of claim 1, wherein a given entry in the database cache includes a cache key storing a cell number of a geospatial cell corresponding to the given entry and a cache value storing cache parameters for the geospatial cell, and wherein the cache parameters include a search region radius for the geolocation query and an entity threshold requirement for the geolocation query.

7. The method of claim 1, wherein determining the first geographic location of the user computing device is performed based on one or more types of the following types of information: a global positioning system (GPS) location of the user computing device, an internet protocol (IP) address of the user computing device, and location information entered by a user into the user computing device.

8. The method of claim 1, wherein the geolocation query is a k-nearest neighbor (kNN) query.

9. The method of claim 1, wherein the plurality of entities are merchants, wherein the geolocation query is further executed based on one or more query refinement parameters including one or more of the following types of parameters: current promotions offered by the merchants, whether a user of the user computing device previously interacted with the merchants, and whether one or more users corresponding to the user computing device previously interacted with the merchants.

10. A non-transitory computer-readable medium having instructions stored thereon that are executable by a computing device to perform operations comprising:
   determining query parameters for a plurality of geospatial cells, wherein determining the query parameters for a given geospatial cell includes:
      determining whether a geographic area encompassed by the given geospatial cell is a densely populated area; and
      in response to determining that the geographic area is a densely populated area, calculating a radius for the given geospatial cell as a sum of: (a) a distance from a center point of a user computing device within the given geospatial cell to a center point of the given geospatial cell and (b) a distance from the center point of the given geospatial cell to a location of an entity within the given geospatial cell;
   storing the query parameters in a database cache;
   receiving, by the computer system from a first user computing device, a request to access geolocation information for a plurality of entities;
   determining, based on the request, a first geographic location of the first user computing device;
   identifying that the first geographic location is located within a first geospatial cell of the plurality of geospatial cells stored in the database cache;

determining, based on the first geographic location being located within the first geospatial cell, whether cached query parameters for locating a plurality of entities within the first geospatial cell are stored in the database cache, and retrieving, based on determining that the database cache stores query results, the cached query parameters; and executing, based on the cached query parameters, a geolocation query on a database storing location information for different entities, wherein results of the geolocation query are different from query results of one or more other queries executed, based on the cached query parameters, for other user computing devices located within the first geospatial cell based on the cached query parameters.

11. The non-transitory computer-readable medium of claim 10, wherein the cached query parameters corresponding to the first geospatial cell further correspond to a query previously performed, for a second user computing device previously located in the first geospatial cell, on the database storing location information for a plurality of entities.

12. The non-transitory computer-readable medium of claim 10, wherein determining the query parameters for one or more of the plurality of geospatial cells further includes calculating a radius for the one or more geospatial cells by:

dividing a length of a diagonal of the one or more geospatial cells by two; and adding a predetermined minimum radius to a result of the dividing.

13. The non-transitory computer-readable medium of claim 10, wherein calculating the radius for the given geospatial cell further includes calculating a sum of a result of the sum of (a) and (b) and a length of a diagonal of the given geospatial cell.

14. The non-transitory computer-readable medium of claim 10, wherein determining the query parameters for the plurality of geospatial cells includes:

retrieving, from the database cache and based on respective query parameters, geographic locations of entities located within the plurality of geospatial cells, wherein respective ones of the geographic locations include a latitude and longitude of a given entity; and storing, based on determining that results of the retrieving satisfy an entity threshold requirement, the query parameters in the database cache, wherein a given entry in the database cache includes a cache key storing a cell number of a geospatial cell corresponding to the given entry and a cache value storing cache parameters for the geospatial cell, and wherein the cache parameters include a search region radius for the geolocation query and the entity threshold requirement for the geolocation query.

15. The non-transitory computer-readable medium of claim 10, wherein the plurality of entities are merchants, wherein the geolocation query is further executed based on one or more query refinement parameters including one or more of the following types of parameters: current promotions offered by the merchants, whether a user of the first user computing device previously interacted with the merchants, and whether one or more users corresponding to the first user computing device previously interacted with the merchants.

16. A system, comprising:

a processor; and a non-transitory computer-readable medium having instructions stored thereon that are executable by the processor to cause the system to perform operations comprising:

determining query parameters for a plurality of geospatial cells, including calculating a radius for respective ones of the plurality of geospatial cells, wherein calculating the radius for a given geospatial cell of the plurality of geospatial cells includes:

dividing a length of a diagonal of the given geospatial cell by two; and adding a predetermined minimum radius to a result of the dividing;

storing the query parameters in a database cache;

receiving, from a first user computing device, a first request to access geolocation information for a plurality of entities;

determining, based on the first request, a geographical location of the first user computing device;

identifying that the geographic location of the first user computing device is located within a first geospatial cell of the plurality of geospatial cells stored in the database cache;

determining, based on the geographic location of the first user computing device being located within the first geospatial cell, whether cached query parameters for locating a plurality of entities within the first geospatial cell are stored in the database cache, and selecting, based on determining that cached query parameters for the first geospatial cell are not stored in the database cache, query parameters for the first request, wherein the query parameters indicate a search region with the geographic location of the first user computing device at a center point of the search region; and executing, based on the query parameters selected for the first request, a geolocation query on a database storing location information for different entities; and storing the query parameters selected for the first request in an entry of the database cache corresponding to the first geospatial cell, wherein the query parameters selected for the first request are usable in geolocation queries performed for other user computing devices located at different locations than the first user computing device within the first geospatial cell.

17. The system of claim 16, wherein the instructions are further executable to cause the system to perform operations comprising:

receiving, from a second user computing device, a second request to access geolocation information for a plurality of entities;

determining, based on the second request, a geographic location of the second user computing device;

identifying that the geographic location of the second user computing device is located within the first geospatial cell in the database cache; and executing, based on the query parameters selected for the first request and stored in the database cache for the first geospatial cell, a geolocation query for the second request from the second user computing device.

18. The system of claim 16, wherein a given entry in the database cache includes a cache key storing a cell number of a geospatial cell corresponding to the given entry and a cache value storing cache parameters for the geospatial cell, and wherein the cache parameters include a search region radius for the geolocation query and an entity threshold requirement for the geolocation query.

19. The system of claim 16, wherein determining the query parameters for the plurality of geospatial cells further includes:

determining whether a geographic area encompassed by the given geospatial cell is a densely populated area based on comparing a number of entities within the given geospatial cell with an entity threshold requirement.

20. The system of claim 19, wherein in response to determining that the given geospatial cell is a densely populated area, calculating a radius for the given geospatial cell by calculating a sum of:

a distance from a center point of a user computing device within the given geospatial cell to a center point of the given geospatial cell;

a distance from the center point of the given geospatial cell to a location of an entity within the given geospatial cell, wherein the entity corresponds to the entity threshold requirement; and a length of a diagonal of the given geospatial cell.

\* \* \* \* \*